United States Patent
Ohtani

(10) Patent No.: US 7,142,782 B2
(45) Date of Patent: Nov. 28, 2006

(54) NOISE LIGHT ELIMINATION METHOD, NOISE LIGHT ELIMINATION APPARATUS AND OPTICAL TRANSMISSION SYSTEM, USING STIMULATED BRILLOUIN SCATTERING

(75) Inventor: Toshihiro Ohtani, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 10/092,305

(22) Filed: Mar. 7, 2002

(65) Prior Publication Data

US 2003/0090757 A1    May 15, 2003

(30) Foreign Application Priority Data

Nov. 15, 2001    (JP)    .............................. 2001-349699

(51) Int. Cl.
*H04B 10/08* (2006.01)
*H04B 10/00* (2006.01)
*H04B 10/12* (2006.01)
*H04J 14/02* (2006.01)
*H01S 3/00* (2006.01)

(52) U.S. Cl. .......................... 398/26; 398/97; 398/159; 398/79; 359/334; 359/337.2

(58) Field of Classification Search .................. 398/26, 398/18, 37, 97, 158, 159, 160, 177, 79, 334, 398/337.2; 359/334, 337, 337.2
See application file for complete search history.

(56) References Cited

U.S. PATENT DOCUMENTS 6,462,844 B1 *  10/2002  Kai et al. ...................... 398/79
6,549,696 B1 *  4/2003   Uetsuka et al. ................ 385/24
6,580,536 B1 *  6/2003   Chraplyvy et al. ........... 398/79
2001/0017729 A1 *  8/2001  Sugaya et al. ......... 359/341.41
2002/0131104 A1 *  9/2002  Johnson et al. ............. 359/124

FOREIGN PATENT DOCUMENTS

| JP | 07-199244 | | 8/1995 |
| JP | 7-199244 | | 8/1995 |
| JP | 07199244 A | * | 8/1995 |
| JP | 10-308703 | | 11/1998 |

* cited by examiner

*Primary Examiner*—Jason Chan
*Assistant Examiner*—Quan-Zhen Wang
(74) *Attorney, Agent, or Firm*—Staas & Halsey LLP

(57) ABSTRACT

The invention is aimed at providing a simple noise light elimination technique capable of eliminating noise light components contained in a signal light, together with wavelength components same as for the signal wavelength, with the condition of the light remaining as is, and an optical transmission system. To this end, an optical transmission system applied with a noise light elimination method according to the present invention comprises a high output type optical repeater and a noise light elimination unit for each required repeating span. This noise light elimination unit includes a dummy transmission path that, when a light of a power exceeding a threshold value is input, generates a return light due to stimulated Brillouin scattering (SBS). The signal light amplified in the optical repeater up to the power exceeding the threshold value is input to the dummy transmission path via an optical input/output section of the noise light elimination unit. The return light due to SBS generated in the dummy transmission path is extracted via the optical input/output section. As a result, the noise light components contained in the signal light are eliminated.

22 Claims, 14 Drawing Sheets

(A)

ALL "1"

(B)

ALL "0"

NOISE LIGHT ELIMINATION METHOD, NOISE LIGHT ELIMINATION APPARATUS AND OPTICAL TRANSMISSION SYSTEM, USING STIMULATED BRILLOUIN SCATTERING

BACKGROUND OF THE INVENTION (1) Field of the Invention

The present invention relates to noise light elimination technology for eliminating noise light components contained in a signal light, in the field of optical communications. In particular, the present invention relates to a method and apparatus for eliminating a noise light with the condition of the light remaining as is, using stimulated Brillouin scattering (SBS), and to an optical transmission system using such method and apparatus.

(2) Background Art

In recent wavelength division multiplexing (WDM) optical systems, long distance optical transmission systems, in general, referred to as long haul systems, in which for example the number of optical repeaters constructed using erbium doped fiber amplifiers (EDFAs) or the like is increased, or a repeating distance is extended by the introduction of Raman amplifiers, have made an appearance. Specifically, a maximum distance from the sending section to receiving section of signal light, is around 500 km to 1000 km in the conventional system. However, in the long haul system, this now exceeds 2000 km to 4000 km.

Incidentally, in the above-mentioned long haul system, an ASE (Amplified Spontaneous Emission) noise light due to a spontaneous emission light generated in the EDFA, or an ASS (Amplified Spontaneous Scattering) noise light due to Raman scattering of excitation light generated in the Raman amplifier is accumulated in each optical repeater. This accumulation of noise light degrades an optical SN ratio (OSNR), and also degrades signal light discrimination characteristics in an optical receiver, thus restricting extension of the repeating distance of the system.

Components of the abovementioned ASE or ASS noise light are generated at a width of several 10 nm in a wavelength band of a main signal light. For dealing with such noise light components, the existing system adopts a method for converting a light into electrical signals at each required repeating span and then generating a signal light that has been again modulated, to transmit, or a method for separating a WDM signal light into optical signals for each channel and then multiplexing the optical signals to transmit the multiplexed light, so as to eliminate the noise light components, thereby achieving a long distance transmission.

FIG. 18 is a block diagram showing a schematic construction of a conventional WDM optical transmission system that performs noise light elimination based on optic-electric conversion. In this conventional system, an optical transmission device 100 wavelength multiplexes, with a multiplexer (MUX) 102, optical signals of respective wavelengths output from a plurality of optical senders ($OS_1$ to $OS_N$) 101, to transmit the generated WDM signal light to an optical transmission path 103. The WDM signal light is then repeatedly transmitted towards an optical receiving device (not shown in the figure) while being amplified by a plurality of optical repeaters 104 arranged at required intervals on the optical transmission path 103. At this time, the accumulated noise light components generated in the respective optical repeaters are eliminated based on the optic-electric conversion by means of a noise light elimination device 300 arranged for each of the optical repeaters of "n" in number.

Specifically, in the noise light elimination device 300, the WDM signal light in which is accumulated the noise light, output from the "n"th stage optical repeater 104, is demultiplexed into optical signals of respective wavelengths by a demultiplexer (DMUX) 301, to be converted into electrical signals in the optical receivers (OR) 302 corresponding to the respective wavelengths. Then, optical signals of respective wavelengths that have been modulated in accordance with the electrical signals output from the respective optical receivers 302 are output from optical senders ($OS_1$ to $OS_N$) 303, and wavelength multiplexed in a multiplexer (MUX) 304. As a result, the WDM signal light with the noise light components eliminated, is output to the optical transmission path 103.

Furthermore, FIG. 19 is a block diagram showing a schematic construction of a conventional WDM optical transmission system that performs noise light elimination based on the demultiplexing and multiplexing of WDM signal light. In this conventional system, the accumulated noise light components generated in the respective optical repeaters 104 are eliminated based on the demultiplexing and multiplexing of WDM signal light by means of a noise light elimination device 400 arranged for each of the optical repeaters 104 of "n" in number. Specifically, in the noise light elimination device 400, the WDM signal light in which is accumulated the noise light, output from the n-th stage optical repeater 104 is demultiplexed by a demultiplexer (DMUX) 401 having a narrow transmission band corresponding to the center wavelength of each channel, and the optical signals of each channel with the noise light components outside of the transmission eliminated, are multiplexed by a multiplexer (MUX) 402 to be output to the optical transmission path 103.

However, in these methods for noise light elimination in the conventional WDM optical transmission system as mentioned above, there are the following problems. At first, in the case of noise light elimination based on optic-electric conversion as shown in FIG. 18, there is a possibility that power variation (tilt) will occur in each of the wavelength lights of the WDM signal light output from the noise light elimination device 300, and hence a function for correcting this tilt must be furnished in the noise light elimination device 300. Specifically, for the noise light elimination device 300, a variable optical attenuator that adjusts the power for each signal light of each channel, or a spectrum analyzer unit (SAU) for monitoring the optical signal power of each wavelength, and electric circuits associated with these must be provided. Using this noise light elimination device 300 thus invites a cost increase for the overall system.

Furthermore, if the repeating span in which the noise light elimination device 300 is positioned becomes long, then at the time of optic-electric conversion, the noise light components contained in the input light of the optical receiver 302 become large so that the OSNR is degraded. Therefore, there is also a problem of the likelihood of errors occurring in the signal decision process in the optical receiver 302.

In the case of the noise light elimination based on the demultiplexing and multiplexing of the WDM signal light as shown in FIG. 19, then compared to the case for the noise light elimination based on the optic-electric conversion, it is no longer necessary to provide the optical receiver and the optical sender in the noise light elimination device 400. However, since the above-mentioned tilt correction for the signal light of each channel is similarly necessary, the device construction becomes complex as a result of providing a variable optical attenuator or SAU or the like, leading to a cost increase for the overall system.

Furthermore, by demultiplexing the WDM signal light for each channel, noise light components of wavelengths different to the signal wavelengths can be eliminated. However, noise light components of wavelengths same as the signal wavelength cannot be eliminated. Therefore, the noise light components of the same wavelength as the signal wavelength are transmitted unchanged together with the signal light from the noise light elimination device 400 to the optical transmission path 103. Hence, if the number of times of repeating operations is increased, the OSNR is degraded, so that a considerable degradation in transmission characteristics occurs.

Furthermore, in the noise light elimination device 400, the WDM signal light output from the optical repeater 104 of former stage passes through the demultiplexer 401 and a multiplexer 402 having in total an insertion loss of around 3 to 6 dB, or a variable optical attenuator for tilt correction having an insertion loss of around several dB, and is sent to the optical transmission path 103. Therefore, there is also a possibility that the optical signal power of each wavelength input to the latter stage optical repeater 104 becomes a low power that does not satisfy the input dynamic range of the optical amplifier to be used for the optical repeater 104.

SUMMARY OF THE INVENTION

The present invention has been achieved in view of the abovementioned points, and it is an object of the present invention to provide a simple noise light elimination method capable of eliminating noise light components contained in a signal light together with wavelength components same as for the signal wavelength, with the condition of the light remaining as is, and a noise light elimination apparatus and an optical transmission system.

In order to achieve the above object, a noise light elimination method according to the present invention, for eliminating noise light components contained in a signal light, is constructed such that a stimulated Brillouin scattering generating medium that generates a return light due to stimulated Brillouin scattering when a light having a power exceeding a threshold value is input, is applied with a signal light that has been amplified up to a power exceeding the threshold value, and the return light generated by the stimulated Brillouin scattering generating medium is extracted as a signal light, to thereby eliminate the noise light components contained in the signal light.

Furthermore, a noise light elimination apparatus according to the present invention, for eliminating noise light components contained in a signal light, comprises: a stimulated Brillouin scattering generating medium that generates a return light due to stimulated Brillouin scattering when a light having a power exceeding a threshold value is input, an optical amplifying section that amplifies a signal light up to a power exceeding the threshold value, and an optical input/output section that applies the signal light amplified by the optical amplifying section to the stimulated Brillouin scattering generating medium, and extracts the return light generated by the stimulated Brillouin scattering generating medium as the signal light.

In the above-mentioned noise light elimination method and apparatus, the signal light amplified up to a power exceeding the threshold value for stimulated Brillouin scattering generation, is extracted as the return light generated by the stimulated Brillouin scattering generation medium. On the other hand, noise light components outside the signal wavelength and noise light components of the same wavelength as the signal wavelength, which are not amplified to reach the threshold value, do not generate stimulated Brillouin scattering even if these are input to the stimulated Brillouin scattering generation medium, and are thus not extracted as the return light. As a result, the noise light components contained in the signal light at the time of input are eliminated with the condition of the light remaining as is, by a simple method compared to the conventional noise light elimination method, and it becomes possible to obtain a signal light of a narrow spectrum width.

Furthermore, in the abovementioned noise light elimination method and apparatus, a power of the return light generated by the stimulated Brillouin scattering generation medium may be adjusted. As a result, the level of the signal light after noise light elimination can be set to a desired value.

The optical transmission system according to the present invention for amplifying a signal light sent from an optical transmission device to an optical transmission path, by optical repeaters arranged on the optical transmission path, to repeatingly transmit the signal light to an optical receiving device, comprises at least one of the aforementioned noise light elimination apparatus according to the invention on the optical transmission path. By having such an optical transmission system, a small scale and low cost system structure can be obtained.

Other objects, characteristics and advantages of the present invention will become apparent in the following description of embodiments, in relation to the appended drawings.

DETAILED DESCRIPTION OF THE INVENTION

Hereunder is a description of embodiments of the present invention, based on the drawings.

Figure 1:
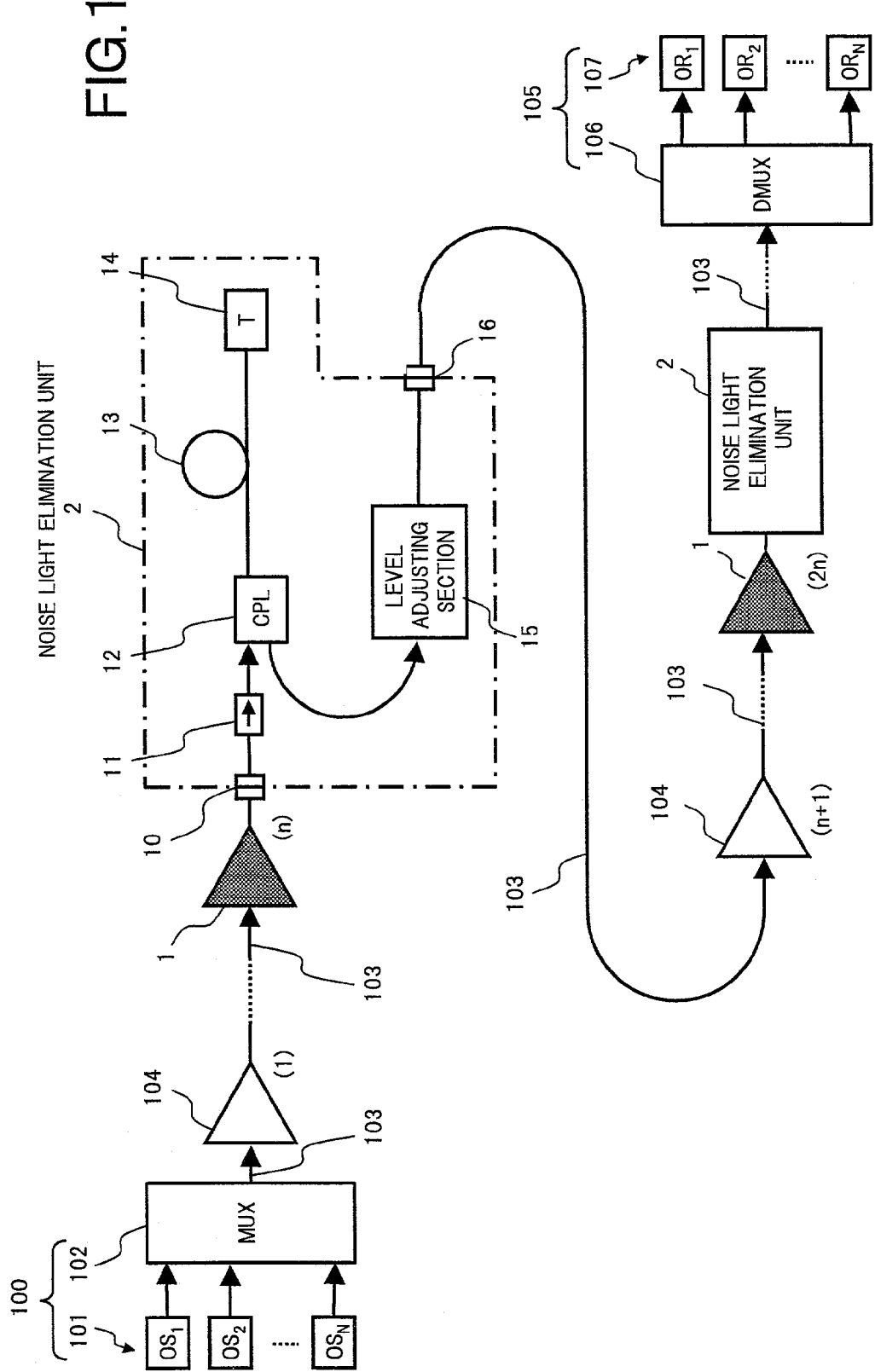
FIG. 1 is a block diagram showing a basic structure of an optical transmission system applied with a noise light elimination method utilizing SBS according to the present invention.

FIG. 1 is a block diagram showing a basic structure of an optical transmission system applied with a noise light elimination method utilizing stimulated Brillouin scattering (hereunder abbreviated to SBS) according to the present invention. Parts similar to the construction of the abovementioned conventional optical transmission system are denoted by same reference symbols.

In FIG. 1, this optical transmission system incorporates a basic structure where, in a system where a WDM signal light transmitted from an optical transmission device 100 to an optical transmission path 103 is repeatedly transmitted towards an optical receiving device 105 while being amplified by a plurality of optical repeaters 104 arranged at required intervals on the optical transmission path 103, there is disposed, for example, an optical repeater 1 incorporating a high output type optical amplifier serving as an optical repeater arranged for each of repeating spans of "n" in number, and a noise light elimination unit 2 is inserted on the optical transmission path 103 positioned on the output side of the optical repeater 1.

The optical repeater 1 amplifies by the high output type optical amplifier, the WDM signal light sent via the optical transmission path 103 from a former stage optical repeater 104, up to a power level capable of generating a return light due to SBS in a dummy transmission path 13 inside the later described noise light elimination unit 2, and then outputs the amplified WDM signal light. For the high output type optical amplifier used for the optical repeater 1, a known optical amplifier may be used. Specifically, for example, a rare earth element doped optical fiber amplifier, a Raman amplifier, a semiconductor optical amplifier or an optical amplifier combining those may be used.

The noise light elimination unit 2 comprises, for example, between an input terminal 10 and an output terminal 16, an optical isolator 11, an optical coupler (CPL) 12, the dummy transmission path 13 serving as an SBS generating medium, a non-reflection terminator (T) 14 and a level adjusting section 15. Here, the optical isolator 11 and the optical coupler 12 function as an optical input/output section. Furthermore, in FIG. 1, the specific construction is shown only for the n-th stage noise light elimination unit 2, however, the construction for the 2n-th stage noise light elimination unit 2 is also the same.

The optical isolator 11 is arranged between the input terminal 10 and the optical coupler 12, being a typical optical part that passes a light traveling from the input terminal 10 to the optical coupler 12 and blocks the passing of light traveling from the optical coupler 12 to the input terminal 10.

The optical coupler 12, here, has for example three ports, with the optical isolator 11 connected to a first port positioned on the upper left side in FIG. 1, the dummy transmission path 13 connected to a second port positioned on the right side in FIG. 1, and the level adjusting section 15 connected to a third port positioned at the bottom left side in FIG. 1. The optical coupler 12 transmits the light input from the optical isolator 11 via the first port through the second port to the dummy transmission path 13, and is input with the return light from the dummy transmission path 13 via the second port, to branch this into two, respectively, thereby outputting the branched lights to the first and third ports. As a specific example of this optical coupler 12, a typical 3 dB coupler having four ports can be used. In a case where a four port 3 dB coupler is used, to the port positioned on the same side as the port connected to the dummy transmission path 13 is connected to a non-reflecting terminator or the like, to be made an unused port, thus constructing the abovementioned transmission route for the light.

The dummy transmission path 13 is an optical transmission path that generates SBS being a type of nonlinear optical phenomenon, when the power of the input light exceeds a required threshold value. This dummy transmission path 13, as described later, generates a return light due to SBS for components (signal light components) where the light power per one channel of the WDM signal light applied to one end thereof via the optical coupler 12 exceeds the threshold value, to output this return light from the one end to the optical coupler 12. Furthermore, the dummy transmission path 13 transmits components where the light power per one channel is less than the threshold value (a part of the signal light component and noise light component) towards the other end, to output to the non-reflection terminator 14, without generating a return light due to SBS.

For the abovementioned dummy transmission path 13, here, an optical fiber transmission path of a required length is used. The length of the optical fiber transmission path is designed beforehand corresponding to the characteristics of the optical fiber to be used, so that a return light due to SBS can be reliably obtained. Specifically, this may be around several km to 20 km. As a specific example for the optical fiber being utilized in the dummy transmission path 13, there can be used, for example, a 1.3 μm zero dispersion single mode fiber (SMF) being utilized for general optical fiber transmission paths, or a dispersion-shifted fiber (DSF), a non-zero dispersion-shifted fiber (NZ-DSF), a dispersion compensation fiber (DCF) or the like. In particular, if a dispersion compensation fiber is used, since SBS is generated even with the power of the input light of a small value (for example, around 4 dBm/ch), the an output level of the optical repeater 1 can be suppressed.

Here, for the dummy transmission path 13, an optical fiber transmission path of a required length is used. However, the SBS generating medium in the present invention is not limited to a transmission path using the abovementioned optical fiber, and an optical waveguide designed to have a required length may be used. Furthermore, the form of the SBS generating medium is not limited to a transmission path using an optical fiber or an optical waveguide or the like, and can be any arbitrary form capable of effectively obtaining a return light due to SBS of the input light.

The non-reflection terminator 14 is connected to the other end of the dummy transmission path 13 opposite to the one end connected to the optical coupler 12, and absorbs and terminates the light passed through the dummy transmission path 13.

The level adjusting section 15 is input with the light output from the third port of the optical coupler 12, that is, a part of the return light due to SBS in the dummy transmission path 13, and amplifies or attenuates this return light to thereby output a WDM signal light adjusted to a required power level, to the output terminal 16.

The optical transmission device 100, the other optical repeaters 104 other than the respective optical repeaters 1 positioned at the former stages of the respective noise light elimination units 2, and the optical receiving device 105 are the same as those used in conventional optical transmission systems. Specifically, the optical transmission device 100 has a plurality of optical senders ($OS_1$ to $OS_N$) 101 and a multiplexer (MUX) 102, and wavelength multiplexes optical signals of different wavelengths output from the respective optical senders 101, by the multiplexer (MUX) 102, to transmit the multiplexed signal light to the optical transmission path 103.

The optical repeater 104 amplifies the WDM signal light transmitted on the optical transmission path 103, up to a required level and repeatingly transmits this. The output light level of each optical repeater 104 is set to be sufficiently low compared to the output light level of the optical repeater 1, so that the generation of the nonlinear optical phenomenon in the optical transmission path 103 is suppressed.

The optical receiving device 105 has a demultiplexer (DMUX) 106 and a plurality of optical receivers ($OR_1$ to $OR_N$), and demultiplexes the WDM signal light transmitted on the optical transmission path 103, by the demultiplexer 106 for each of the signal lights of the respective channels, and reception processes these in optical receivers 107 corresponding to each of the signal lights.

Next is a description of an operation of the optical transmission system provided with the abovementioned basic construction.

In this optical transmission system, the WDM signal light transmitted from the optical transmission device 100 to the optical transmission path 103 is repeatedly transmitted while being sequentially amplified in the optical repeaters 104 arranged at required repeating intervals, and then reaches the n-th optical repeater 1 incorporating the high output type optical amplifier. The WDM signal light input to this n-th optical repeater 1 is a light in which the noise light components such as of ASE and ASS generated in the first to (n−1)-th optical repeaters 104 are accumulated over the whole optical amplification band. In the optical repeater 1, the WDM signal light including the abovementioned noise light, is amplified up to a light power level capable of generating a return light due to SBS in the dummy transmission path 13 of the noise light elimination unit 2, and the amplified WDM signal light is then sent to the noise light elimination unit 2.

Figure 2:
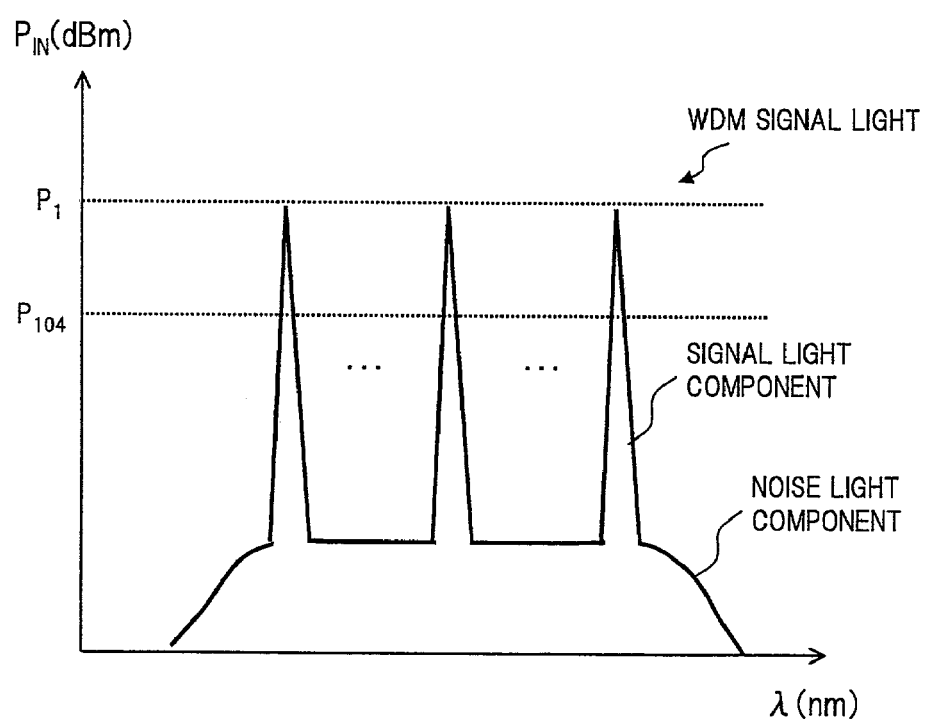
FIG. 2 is a diagram showing one example of light power with respect to the wavelength of WDM signal light input to a noise light elimination unit, in the optical transmission system of FIG. 1.

FIG. 2 is a diagram showing one example of light power $P_{IN}$ with respect to a wavelength λ of the WDM signal light input to the noise light elimination unit 2 from the optical repeater 1. As shown in FIG. 2, in the optical repeater 1, all of the WDM signal light is amplified until the signal light power per one channel included in the WDM signal light reaches a previously set level $P_1$. This output light power $P_1$ per one channel is set based on a threshold value $P_{TH}$ for the input light power to the dummy transmission path 13, which is capable of obtaining an effective return light due to SBS caused in the dummy transmission path 13, and insertion losses of the respective optical parts (here the optical isolator 11 and the optical coupler 12) arranged between an output end of the optical repeater 1 and an input end of the dummy transmission path 13. A light power $P_{104}$ in FIG. 2 shows the power per one channel of the WDM signal light to be amplified and output by the optical repeater 104 of each stage ($P_1 > P_{104}$).

To give a specific example for the abovementioned setting, the input light power threshold value $P_{TH}$ to enable generation of SBS in the dummy transmission path 13 to obtain a return light can be set to approximately 10 dBm/ch or more, in a case where a 1.3 µm zero dispersion SMF is used for the dummy transmission path 13, while this can be set to approximately 7 dBm/ch or more in a case where a DSF is used, and this can be set to approximately 4 dBm/ch or more in a case where a DCF is used. If the insertion loss for the optical isolator 11 is estimated at 1 dB, and the insertion loss for the optical coupler 12 is estimated at 4 dB, the output light power $P_1$ of the optical repeater 1 can be set to a level in which 5 dB is added to each threshold value corresponding to the abovementioned each dummy transmission path 13, or more. The setting for the output light power $P_1$ of the optical repeater 1 is not limited to the abovementioned example.

Figure 3:
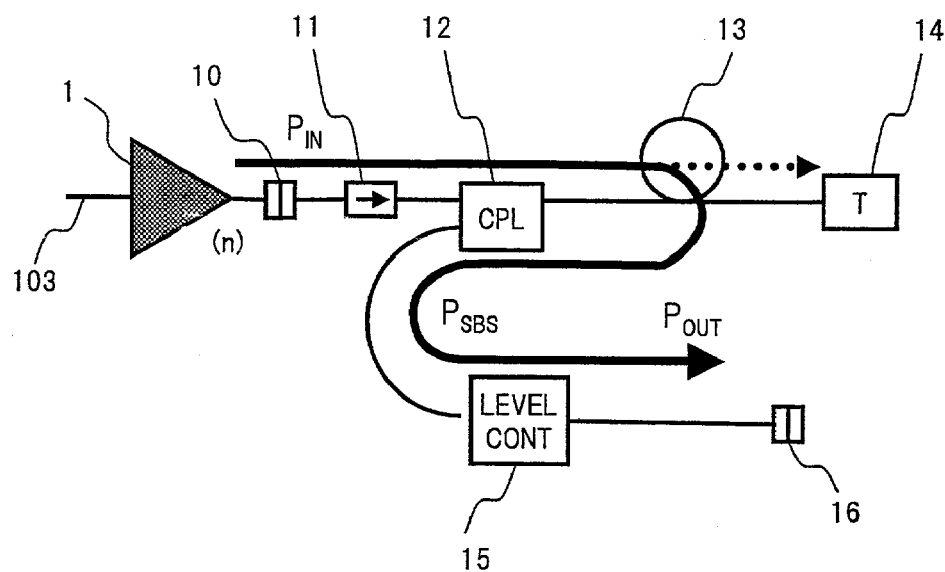
FIG. 3 is a diagram showing a transmission route of signal light in the optical transmission system of FIG. 1.

The WDM signal light from the optical repeater 1 applied to the input terminal 10 of the noise light elimination unit 2, as shown by the thick arrow in FIG. 3, passes sequentially through the optical isolator 11 and the optical coupler 12 to be input to one end of the dummy transmission path 13. In the dummy transmission path 13, for component of the input light having a power exceeding the abovementioned threshold value $P_{TH}$, a return light due to SBS is generated, and this return light is output from the input end of the dummy transmission path 13 to be again input to the optical coupler 12. On the other hand, the component of the input light to the dummy transmission path 13 having a power less than the threshold value $P_{TH}$ is propagated within the dummy transmission path 13 towards the end opposite to the input end, to be absorbed by the non-reflection terminator 14.

Here, the return light due to SBS generated in the dummy transmission path 13 will be described in detail.

Figure 4:
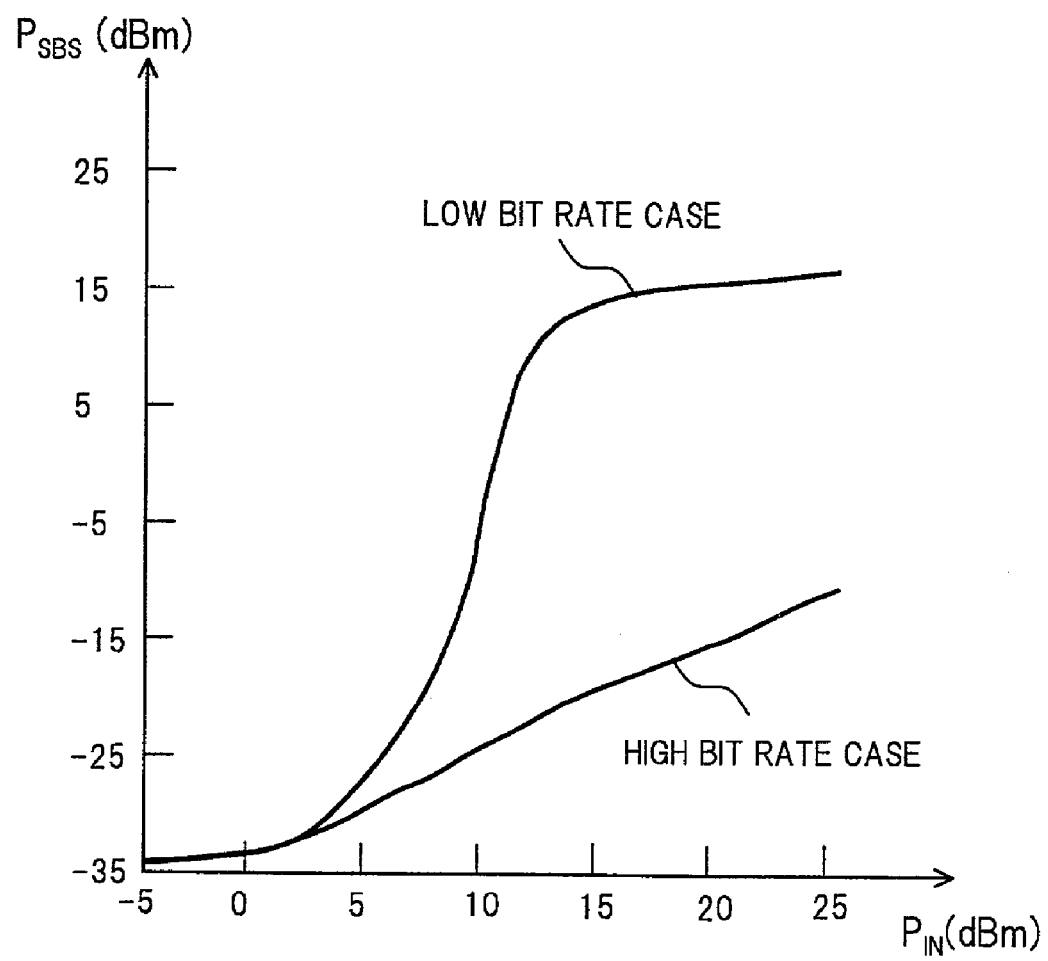
FIG. 4 is a diagram showing a relationship of a return light power due to SBS with respect to an input light power, corresponding to a modulation bit rate.

SBS, being one type of nonlinear optical phenomenon, is a phenomenon where, in a case where a high output narrow band optical signal is input to a transmission path, a scattered light traveling in an opposite direction to the input light is amplified and returned. It is known that a power of the return light is changed, for example as shown in FIG. 4, according to the input light power $P_{IN}$ and a modulation bit rate. Specifically, the greater the input light power $P_{IN}$ the greater the power of the return light, and when the input light power $P_{IN}$ becomes greater than a certain value, most of the input light is returned. Furthermore, the power of the return light shows a tendency to be decreased, the higher the modulation bit rate.

Figure 5:
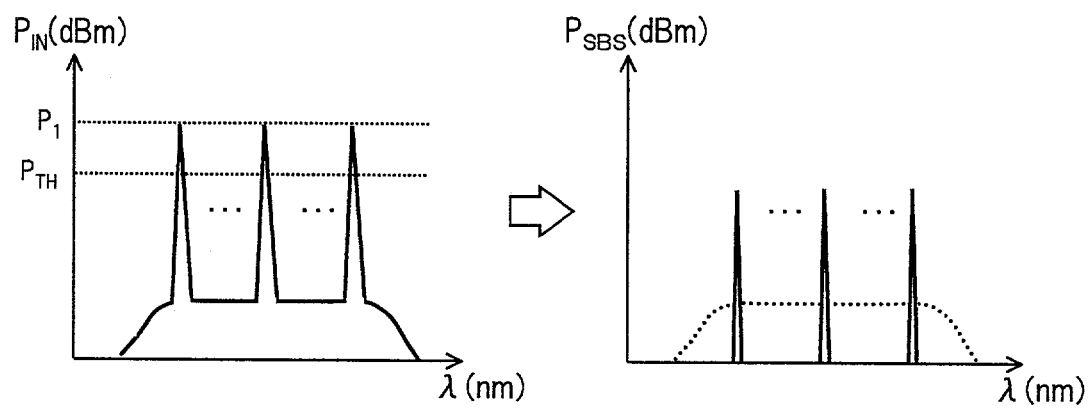
FIG. 5 is a diagram for explaining a theory of noise light elimination using SBS of the present invention, (A) showing an emitting state for where signals of each channel are all "1", and (B) showing an extinction state for where signals of each channel are all "0".
Figure 5:
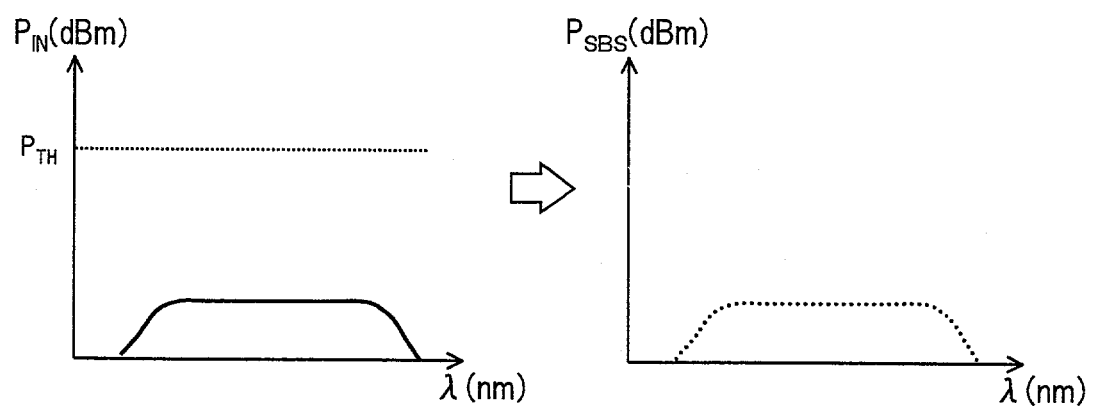

The theory for utilizing the return light due to SBS having these characteristics to eliminate the noise light accumulated in the WDM signal light, can be simply explained by considering, for example as shown in FIG. 5, an emitting state where the signals of each channel input to the dummy transmission path 13 all become "1" and an extinction state where these all become "0".

As shown on the left side of (A) in FIG. 5, in the case where the input lights to the dummy transmission path 13 all become "1", the signal light power of each channel is amplified up to a level exceeding the threshold value $P_{TH}$ for SBS generation. Therefore, each of the signal lights is returned to the input terminal of the dummy transmission path 13 as a return light due to SBS. On the other hand, the components outside of the signal wavelength, that is, the noise light components of the accumulated ASE, the ASS and the like, which are located intermediate of the center wavelengths of respective channels, do not reach a power level for SBS generation. Therefore, these do not return the input terminal of the dummy transmission path 13 as a return light, and are propagated towards the end opposite to the input end. As a result, as shown by the return light power $P_{SBS}$ on the right side of (A) in FIG. 5, only the signal light component (solid line part) of each channel is extracted, so that a WDM signal light for which the noise light component (dotted line part) has been eliminated can be obtained. The return light power $P_{SBS}$ illustrated in (A) of FIG. 5 has a level to be changed in accordance with the input power of the signal light and the modulation bit rate, as shown in FIG. 4.

On the other hand, in a case where, as shown on the left side in (B) of FIG. 5, the input lights to the dummy transmission path 13 all become "0", since the noise light components of the ASE, ASS and the like existing other than the signal wavelength do not reach to a power level for SBS generation, these are not returned to the input end of the dummy transmission path 13 as a return light. Furthermore, only the noise light components exist in the vicinity of the center wavelength of each channel. However, since these noise light components also as with the abovementioned case, do not reach a power level for SBS generation, a return light due to SBS is not obtained. As a result, as shown on the right side in (B) of FIG. 5, the noise light components existing in all of the wavelength band of the WDM signal light (the dotted line part) can be eliminated.

According to the noise light elimination method utilizing the return light due to SBS in this manner, for the WDM signal light input to the dummy transmission path 13, only the signal light components showing "1" are extracted, and both the noise light components outside of the signal wavelength and the noise light components of the signal wavelength for the case where the signal light shows "0" are reliably eliminated.

Figure 6:
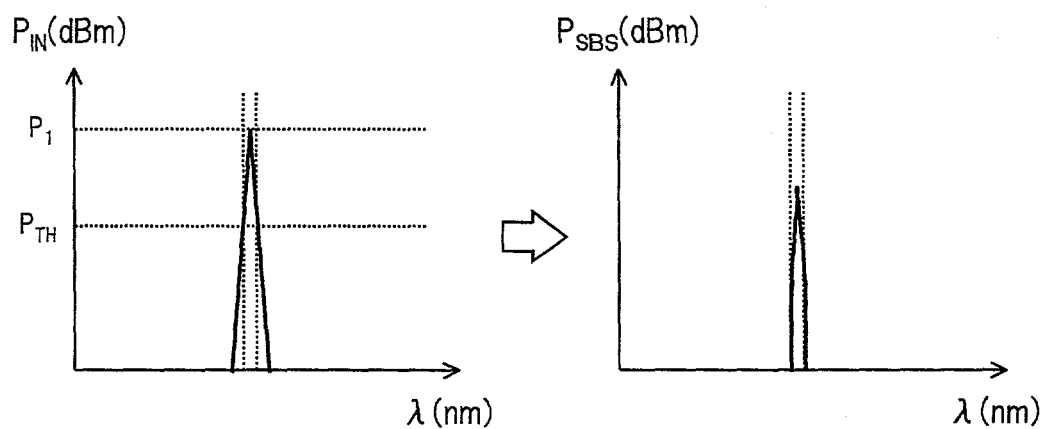
FIG. 6 is a diagram for explaining an effect where a signal light spectrum in noise light elimination using SBS of the present invention becomes thin.

Furthermore, according to the noise light elimination method utilizing the return light due to SBS, there is obtained a functional effect where the spectrum of the signal light extracted as the return light becomes narrow (the wavelength component is reduced). Specifically, for example as shown on the left side of FIG. 6, the wavelength range where the signal light power exceeds the threshold value $P_{TH}$ for SBS generation becomes narrower than the width of the signal wavelength. Therefore, as shown on the right side of FIG. 6, the spectrum width of the signal light component to be extracted as a return light becomes narrower than at the time of input. Such a functional effect reduces an influence of wavelength dispersion, for example in the optical transmission path 103, and hence is advantageous in the transmission of WDM signal light.

Figure 7:
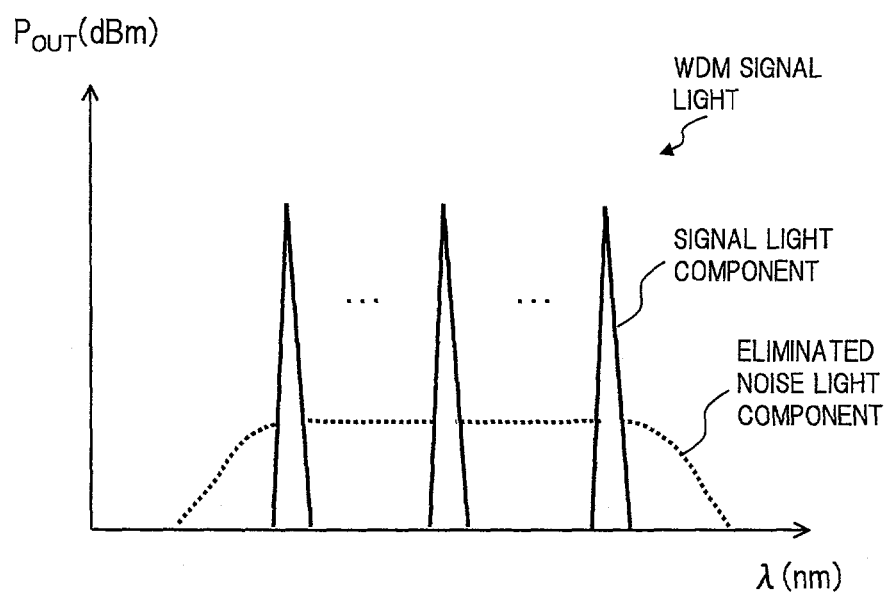
FIG. 7 is a diagram showing an example of light power with respect to the wavelength of WDM signal light output from the noise light elimination unit, in the optical transmission system of FIG. 1.

The return light due to SBS generated in the dummy transmission path 13 as described above, is again input to the optical coupler 12 and branched into two, to be output, respectively, from the respective ports connected to the optical isolator 11 and the level adjusting section 15. The return light output to the optical isolator 11 side is blocked from passing through the optical isolator 11, so as to avoid an influence on the amplification operation of the optical repeater 1. On the other hand, for the return light output to the level adjusting section 15 side, the signal lights of respective channels are amplified or attenuated in the level adjusting section 15, so that for example as shown in FIG. 7, a WDM signal light adjusted to a desired power level $P_{OUT}$ is output to the optical transmission path 103 via the output terminal 16. Then, the WDM signal light output to the optical transmission path 103 is repeatedly transmitted towards the optical receiving device in the same way as for the first to n-th stages.

Here, the influence of nonlinear optical phenomenon other than SBS in the noise light elimination method as described above will be briefly described.

In this noise light elimination method, when the pulse of the input light and the pulse of the return light due to SBS pass by each other inside the dummy transmission path 13, there is a case where cross phase modulation (XPM) occurs due to the rising portion and the falling portion of the pulses of each other's. However, since the directions of the wavelength shifts occurred by the XPM are in opposite directions for the input light and the return light, the wavelength shift for each direction is effectively cancelled due to the pulses reciprocating in the dummy transmission path 13. Consequently, it is considered that the influence of XPM on the return light due to SBS is not caused practically.

Furthermore, during a period of time from when the high output signal light from the optical repeater 1 is input to the dummy transmission path 13 until this is returned due to SBS, there is a case where self phase modulation (SPM) or four wave mixing (FWM) is generated. However, the light of a different wavelength generated due to this does not cause SBS, and hence this light is not returned to the input end of the dummy transmission path 13. Consequently, it is considered that there is not remained an influence of the SPM and FWM on the return light due to SBS.

According to the present optical transmission system as described above, in nodes (repeating sections) for eliminating the noise light, the noise light can be reliably eliminated by simply altering the optical amplifier provided in the optical repeater to a high output type optical amplifier, and providing the noise light elimination unit 2 comprising the dummy transmission path 13 and several passive parts. Therefore, compared to the conventional noise light elimination method based on optic-electric conversion, or signal light demultiplexing and multiplexing, the system structure can be made small scale and low cost. Furthermore, by utilizing the return light due to SBS, noise light components of the wavelength same as the signal wavelength can be effectively eliminated. Hence, a WDM signal light in a condition very close to that at the time transmitted from the optical transmission device 100 can be produced. Moreover, since a signal light with a narrow spectrum width can be obtained, the influence of wavelength dispersion and the like in the optical transmission path 103 can also be reduced.

Figure 8:
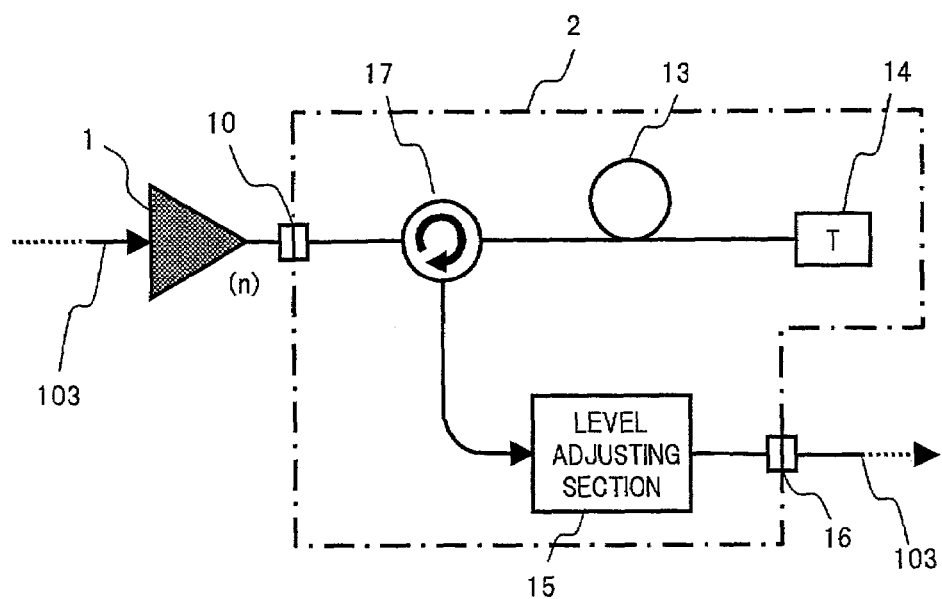
FIG. 8 is a block diagram showing another constitutional example related to the basic structure of the optical transmission system of FIG. 1.

In the abovementioned basic structure shown in FIG. 1, as the optical input/output section that inputs a signal light to the dummy transmission path 13 and extracts a return light, the optical isolator 11 and the optical coupler 12 are provided. However, the construction of the optical input/output section in this invention is not limited to this. For example as shown in FIG. 8, instead of the optical isolator 11 and the optical coupler 12, there may be provided an optical circulator 17. This optical circulator 17 is an optical device with the input terminal 10 connected to a first port, the dummy transmission path 13 connected to a second port, and the level adjusting section 15 connected to a third port, capable of transmitting a light traveling in a direction from the first port to the second port, and in a direction from the second port to the third port. By using such an optical circulator, the construction of the noise light elimination unit 2 can be made even simpler.

Next is a description of specific embodiments of an optical transmission system provided with the abovementioned basic structure.

Figure 9:
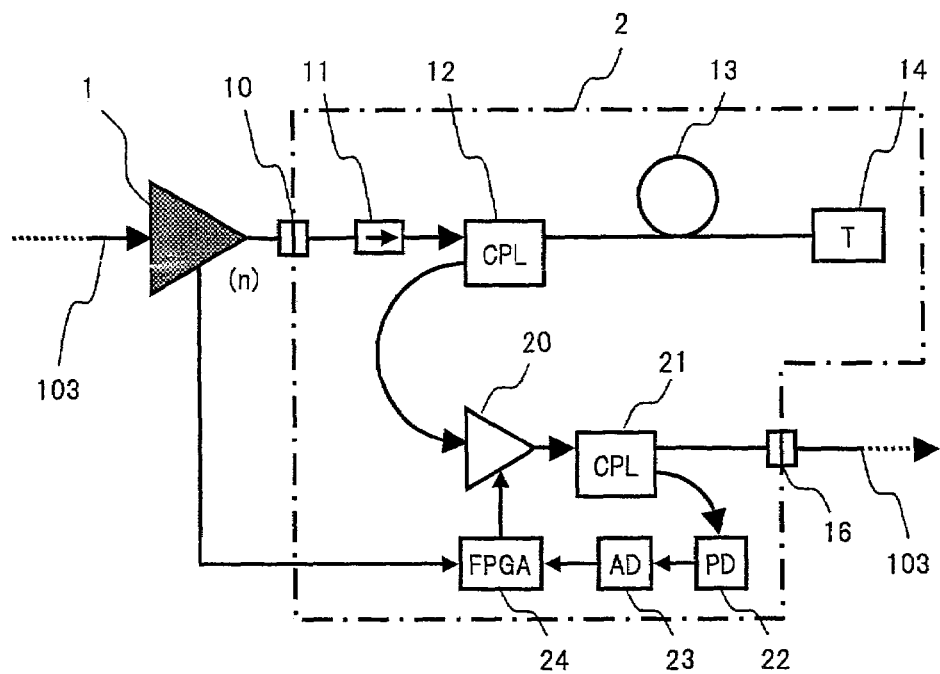
FIG. 9 is a block diagram showing the construction of the main parts of an optical transmission system according to a first embodiment of the present invention.

FIG. 9 is a block diagram showing the construction of the main parts of an optical transmission system according to a first embodiment. Parts the same as for the abovementioned basic structure shown in FIG. 1 are denoted by the same reference symbols and description is omitted, and the same applies for other embodiments hereunder.

In FIG. 9, the optical transmission system of the first embodiment is constructed such that, for example in the basic structure of FIG. 1, as the level adjusting section 15 of the noise light elimination unit 2, there is adopted a specific construction for amplifying the return light due to SBS to a required level by an optical amplifier. The construction of other parts of the noise light elimination unit 2 other than those mentioned above, and the structure of the overall optical transmission system, are the same as for the case of the basic structure of FIG. 1.

Specifically, the construction corresponding to the level adjusting section 15 includes, for example, an optical amplifier 20, an optical coupler (CPL) 21, a light receiver (PD) 22, an AD converter 23 and a controlling circuit 24.

The optical amplifier 20 is arranged on an optical path between the third port of the optical coupler 12 and the output terminal 16 of the noise light elimination unit 2, and amplifies a return light due to the SBS extracted by the optical coupler 12 by a gain in accordance with an output signal from the controlling circuit 24, to output the amplified return light. For the optical amplifier 20, a known optical amplifier, for example, a rare earth element doped optical fiber amplifier, a semiconductor optical amplifier or the like may be used.

The optical coupler 21 branches a part of the WDM signal light output from the optical amplifier 20 to the output terminal 16, to send the branched light to the light receiver 22. The light receiver 22 receives the branched light from the optical coupler 21 and generates an electrical signal corresponding to a power of the branched light, to output the electrical signal to the AD converter 23. The AD converter 23 converts the analog electrical signal from the light receiver 22 into a digital signal to send the digital signal to the controlling circuit 24.

The controlling circuit 24, based on an output signal from the AD converter 23 and transmission information from the optical repeater 1, generates a control signal for controlling the amplification operation of the optical amplifier 20 so that the power of the WDM signal light output from the optical amplifier 20 becomes a target value. For a specific example of this controlling circuit 24, an integrated circuit such as an FPGA (Field Programmable Gate Array) may be used.

In the noise light elimination unit 2 of the abovementioned construction, the return light due to SBS generated in the dummy transmission path 13 is extracted by the optical coupler 12, and amplified by the optical amplifier 20 to be output to the output terminal 16. At this time, a part of the output light from the optical amplifier 20 is branched by the optical coupler 21, the total power of the return light is monitored by the light receiver 22, and the monitor result is transmitted to the controlling circuit 24 via the AD converter 23. In the controlling circuit 24, in accordance with the transmission information such as the number of channels transmitted from the optical repeater 1 and the output level target value, and based on a value obtained by dividing the monitored total power transmitted from the AD converter 23 by the number of channels, a light power per one channel of the WDM signal light output from the optical amplifier 20 is obtained, and a control signal is generated for controlling the amplification operation of the optical amplifier 20 so that the obtained light power coincides with the target value. Then, by adjusting the gain of the optical amplifier 20 in accordance with this control signal, the WDM signal light as shown in FIG. 7 for which the signal light power of each channel is made uniform at a desired level, is output via the output terminal 16 to the optical transmission path 103. Amplification of the return light due to SBS by the optical amplifier 20 generates a noise light such as ASE and the like. However, the noise light generated by the optical amplifier 20 is slight compared to the noise light generated and accumulated in the first to n-th stages, and hence the effect of noise light elimination in the dummy transmission path 13 is sufficiently obtained.

In this manner, according to the optical transmission system of the first embodiment, even when the level of the return light due to SBS generated in the dummy transmission path 13 of the noise light elimination unit 2 becomes small, such as for example in the case where the modulation bit rate of the signal light is high, a WDM signal light amplified up to a desired level by the latter stage optical amplifier 20 can be stably output.

Next is a description of an optical transmission system according to a second embodiment.

Figure 10:
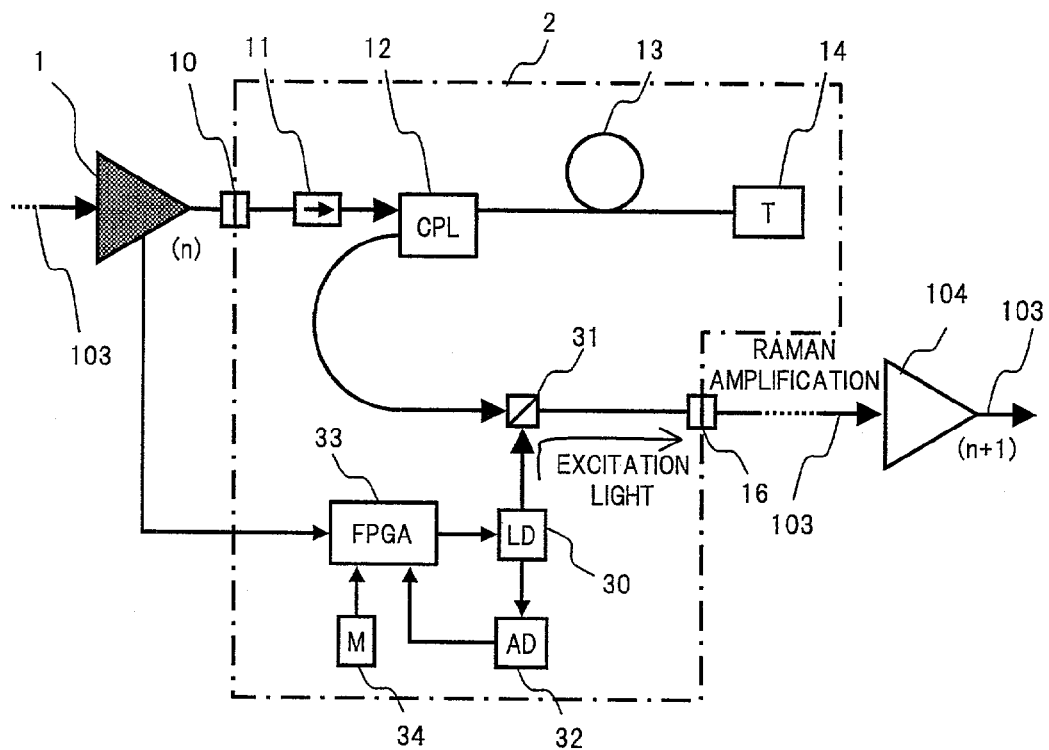
FIG. 10 is a block diagram showing the construction of the main parts of an optical transmission system according to a second embodiment of the present invention.

FIG. 10 is a block diagram showing the construction of the main parts of the optical transmission system according to the second embodiment.

In FIG. 10, the optical transmission system of the second embodiment is a modified example of the aforementioned first embodiment shown in FIG. 9, with the return light due to SBS being amplified up to a required level by Raman amplification. Specifically, the construction corresponding to the level adjusting section 15 of the noise light elimination unit 2, includes an excitation light source (LD) 30 for Raman amplification, a WDM coupler 31, an AD converter 32, a controlling circuit 33 and a memory 34.

The excitation light source 30 for Raman amplification generates an excitation light of a wavelength range previously set corresponding to a wavelength band of the WDM signal light being transmitted, and supplies this excitation light to the optical transmission path 103 on the reception side via the WDM coupler 31 and the output terminal 16, to thereby enable Raman amplification of the WDM signal light propagated through the optical transmission path 103. The AD converter 32 AD converts an electrical signal indicative of a drive condition of the excitation light source 30 to output the AD converted signal to the controlling circuit 33.

The controlling circuit 33, based on an output signal from the AD converter 32, transmission information from the optical repeater 1 and storage information of the memory 34, generates a control signal for controlling the drive condition of the excitation light source 30 so that the power of the WDM signal light propagated through the optical transmission path 103 and input to the next stage ((n+1)-th stage) optical repeater 104 reaches a desired level. For the controlling circuit 24, an integrated circuit such as an FPGA can be used. Furthermore, it is assumed that the memory 34 stores information related for example to a previously examined relationship between the output light power of the excitation light source and a Raman amplification gain, or transmission distance (=attenuation amount) up to the next stage optical repeater 104.

In the noise light elimination unit 2 of the abovementioned construction, the return light due to SBS generated in the dummy transmission path 13 is extracted by the optical coupler 12, and passes through the WDM coupler 31 to be output to the optical transmission path 103 connected to the output terminal 16. The excitation light output from the excitation light source 30 of which drive condition is controlled by the controlling circuit 33, is supplied to the optical transmission path 103 via the WDM coupler 31, and the WDM signal light (return light) propagated through the optical transmission path 103 is sent to the next stage optical repeater 104 while being Raman amplified. As a result, the WDM signal light Raman amplified up to a desired level is input to the next stage optical repeater 104. Here, Raman amplification of the return light due to SBS in the latter stage optical transmission path 103 generates the ASS noise light. However, this ASS noise light is slight compared to the noise light generated and accumulated in the first to n-th stages, and hence the effect of noise light elimination in the dummy transmission path 13 is sufficiently obtained.

In this manner, according to the optical transmission system of the second embodiment, even when the level of the return light due to SBS generated in the dummy transmission path 13 of the noise light elimination unit 2 becomes small, by using the latter stage optical transmission path 103 as a Raman amplification medium, the WDM signal light Raman amplified up to a desired level can be stably sent to the next stage optical repeater 104.

In the abovementioned first and second embodiments, the output light level of the optical amplifier 20 or the drive condition of the excitation light source 30 is monitored to control the gain with respect to the WDM signal light. However, in a case where the power of the return light due to SBS is known beforehand from experimental results, simulation or the like, the gain may be fixed.

Next is a description of an optical transmission system according to a third embodiment.

Figure 11:
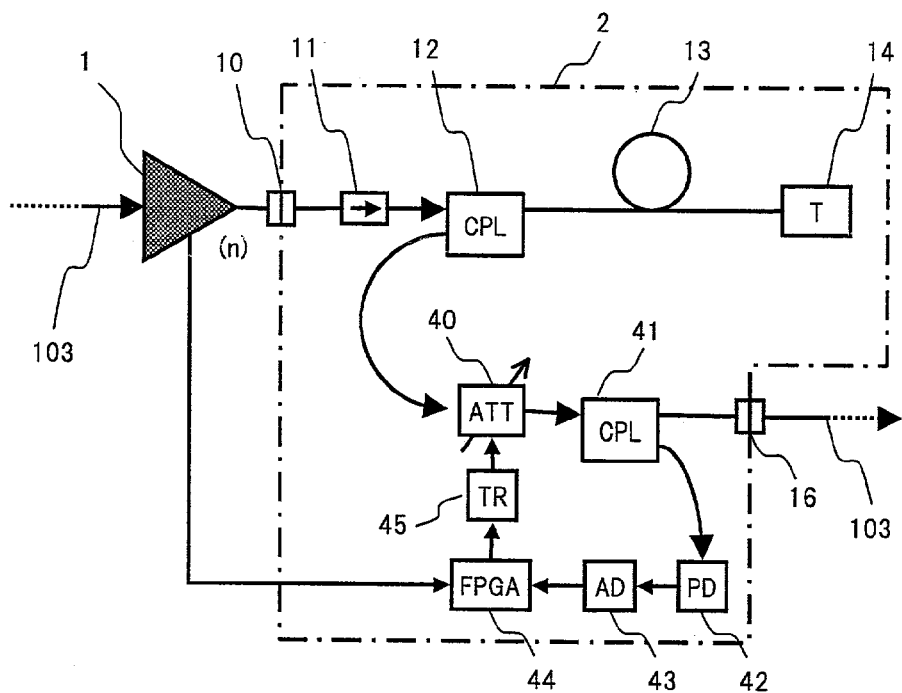
FIG. 11 is a block diagram showing the construction of the main parts of an optical transmission system according to a third embodiment of the present invention.

FIG. 11 is a block diagram showing the construction of the main parts of the optical transmission system according to the third embodiment.

In FIG. 11, the optical transmission system of the third embodiment is constructed such that, for example in the basic structure of FIG. 1, for the level adjusting section 15 of the noise light elimination unit 2, there is adopted a specific construction for attenuating the return light due to SBS down to a required level by a variable optical attenuator. The construction of other parts of the noise light elimination unit 2 other than those mentioned above, and the structure of the overall optical transmission system, are the same as for the case of the basic structure of FIG. 1.

Specifically, the construction corresponding to the level adjusting section 15 includes, for example, a variable optical attenuator (ATT) 40, an optical coupler (CPL) 41, a light receiver (PD) 42, an AD converter 43, a controlling circuit 44 and a transistor (TR) 45.

The variable optical attenuator 40 is arranged on the optical path between the third port of the optical coupler 12 and the output terminal 16 of the noise light elimination unit 2, and attenuates the return light due to SBS extracted by the optical coupler 12 corresponding to a variable attenuation amount to output the attenuated return light. The attenuation amount of the variable optical attenuator 40 is controlled in accordance with a signal obtained by converting the output signal from the controlling circuit 44 to an electric current by the transistor 45.

The optical coupler 41 branches a part of the WDM signal light output from the variable optical attenuator 40 to the output terminal 16, to send the branched light to the light receiver 42. The light receiver 42 receives the branched light from the optical coupler 41 and generates an electrical signal corresponding to a power of the branched light to output the electrical signal to the AD converter 43. The AD converter 43 converts the analog electrical signal from the light receiver 42 into a digital signal to send the digital signal to the controlling circuit 44.

The controlling circuit 44, based on an output signal from the AD converter 43 and transmission information from the optical repeater 1, generates a control signal for controlling the variable attenuation amount of the variable optical attenuator 40, so that the power of the WDM optical signal output from the variable optical attenuator 40 reaches a target value, to transmit this control signal via the transistor 45 to the variable optical attenuator 40. For a specific example of this controlling circuit 44, an integrated circuit such as an FPGA may be used.

In the noise light elimination unit 2 of the abovementioned construction, the return light due to SBS generated in the dummy transmission path 13 is extracted by the optical coupler 12, and attenuated by the variable optical attenuator 40 to be output to the output terminal 16. At this time, a part of the output light from the variable optical attenuator 40 is branched by the optical coupler 41, the total power of the branched light is monitored by the light receiver 42, and the monitor result is transmitted to the controlling circuit 44 via the AD converter 43. In the controlling circuit 44, based on the monitor result from the AD converter 43, and in accordance with transmission information of such as the number of channels transmitted from the optical repeater 1 and the output level target value, the light power per one channel of the WDM signal light output from the variable optical attenuator 40 is obtained, and a control signal is generated for controlling the light attenuation amount of the variable optical attenuator 40 so that the obtained light power coincides with the target value. Then, by adjusting the light attenuation amount of the variable optical attenuator 40 in accordance with this control signal, the WDM signal light for which the signal light power of each channel is made uniform at a desired level, is output via the output terminal 16 to the optical transmission path 103.

In this manner, according to the optical transmission system of the third embodiment, even when the power of the return light due to SBS generated in the dummy transmission path 13 of the noise light elimination unit 2, becomes a large level such that for example a nonlinear optical phenomenon occurs in the latter stage optical transmission path 103, a WDM signal attenuated by the variable optical attenuator 40 down to a level where the nonlinear optical phenomenon does not occur, can be stably output.

In the abovementioned third embodiment, the output light level of the variable optical attenuator 40 is monitored to control the variable attenuation amount. However, in a case where the power of the return light due to SBS is known beforehand from experimental results, simulation or the like, an optical attenuator with the fixed attenuation amount may be used.

Furthermore, in the abovementioned first through third embodiments, there has been adopted a construction using the optical isolator 11 and the optical coupler 12 as the optical input/output section. However, for the input/output section, a construction using the optical circulator 17 as shown in FIG. 8, may be similarly applied to the first through third embodiment.

Next is a description of an optical transmission system according to a fourth embodiment.

Figure 12:
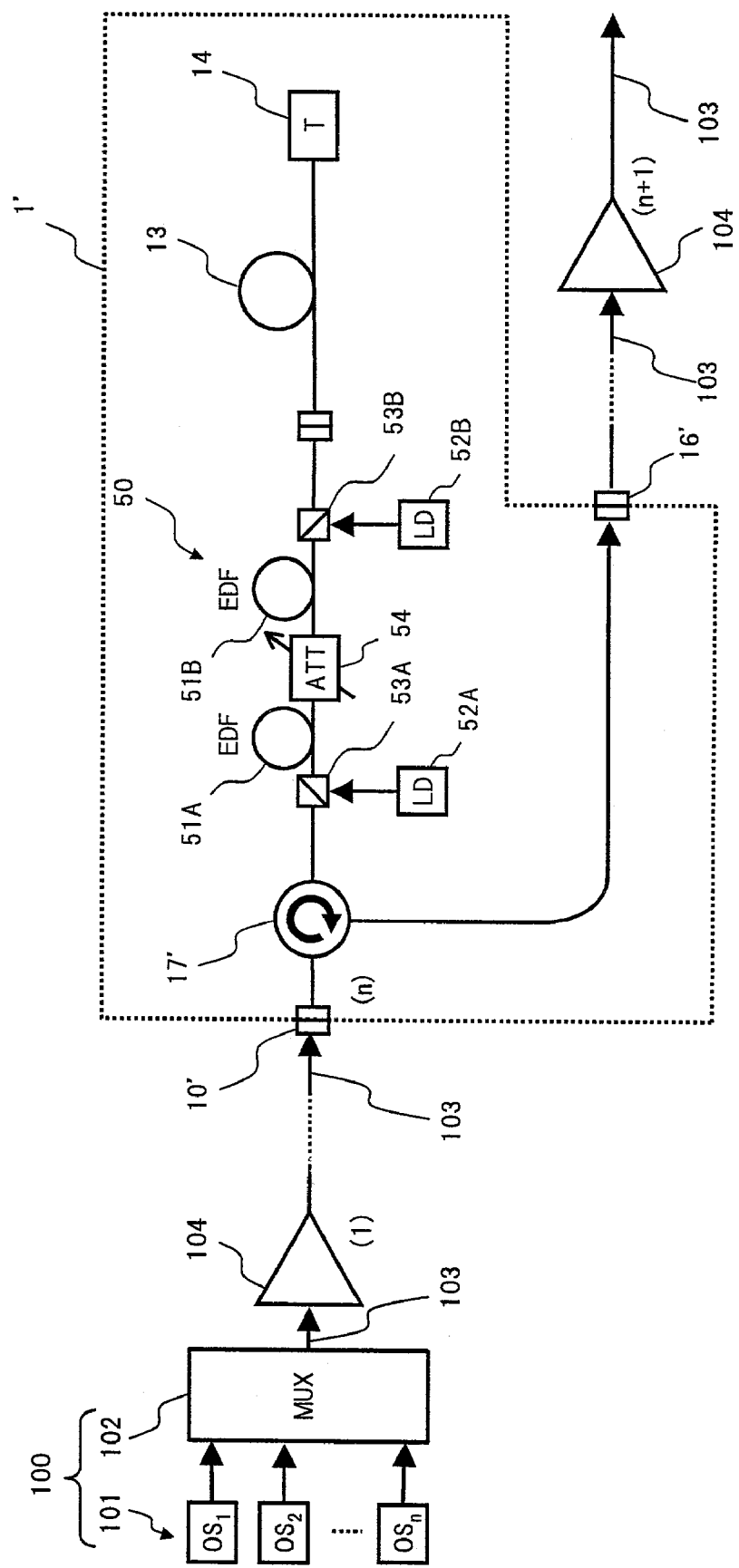
FIG. 12 is a block diagram showing the construction of the main parts of an optical transmission system according to a fourth embodiment of the present invention.

FIG. 12 is a block diagram showing a construction of the main parts of the optical transmission system according to the fourth embodiment.

In FIG. 12, the optical transmission system of the fourth embodiment is an application example of the construction such as shown in FIG. 8, with the function as the high output type optical repeater 1, and the function as the level adjusting section 15 inside the noise light elimination unit 2, realized by a single optical amplifier.

Specifically, for example, as the n-th stage optical repeater of the optical transmission system, there is provided an optical repeater 1' incorporating therein the function as the abovementioned noise light elimination unit 2. This optical repeater 1' comprises an optical circulator 17' between an input terminal 10' and an output terminal 16', an optical amplifier 50, a dummy transmission path 13 and a non-reflection terminator (T) 14.

The optical circulator 17' here an optical device with the input terminal 10' connected to a first port, the optical amplifier 50 connected to a second port, the output terminal 16' connected to a third port, capable of transmitting a light traveling in a direction from the first port to the second port and in a direction from the second port to the third port.

The optical amplifier 50 is here for example of a two stage amplifying construction using erbium doped optical fiber amplifiers (EDFA). More specifically, the optical amplifier 50 comprises first and second erbium doped optical fibers (EDF) 51A and 51B, excitation light sources 52A and 52B that generate excitation lights for the respective EDFs 51A and 51B, respectively, WDM couplers 53A and 53B that supply the excitation lights from the respective excitation light sources 52A and 52B to the EDFs 51A and 51B, and a variable optical attenuator 54 provided in an intermediate between the EDFs 51A and 51B. Furthermore, here, while omitted from the figure, there is also provided a controlling circuit that controls drive conditions of the excitation light sources 52A and 52B or an attenuation amount of the variable optical attenuator 54, in accordance with monitor results for the WDM signal light power output from the optical amplifier 50.

Here, the construction of the optical amplifier 50 is not limited to the abovementioned specific example, and it is also possible to use an optical amplifier of an arbitrary construction capable of amplifying lights propagated in both directions at a high gain.

The dummy transmission path 13 has one end connected to an input/output end of the optical amplifier 50 positioned on the opposite side to the optical circulator 17, and the other end connected to the non-reflection terminator 14. The dummy transmission path 13 and the non-reflection terminator 14 are the same as those used in the abovementioned basic structure.

In the optical transmission system of the abovementioned construction, the WDM signal light transmitted from the optical transmission device 100 to the optical transmission path 103 is repeatedly transmitted while being sequentially amplified in the first to the (n−1)th optical repeaters 104 to be input to the n-th optical repeater 1'. In the optical repeater 1', the WDM signal light with accumulated noise light is sent to the optical amplifier 50 via the input terminal 10' and the optical circulator 17. In the optical amplifier 50, the WDM signal light is propagated in one direction through the respective EDFs 51A and 51B that are supplied with excitation lights from the excitation light sources 52A and 52B, respectively, to be in the excited states, so that the power of this WDM signal light is amplified up to a level exceeding the threshold value $P_{TH}$ for SBS generation in the dummy transmission path 13, to be output to the dummy transmission path 13. Then, in the dummy transmission path 13, only the signal light components of the signal wavelength having a power exceeding the threshold value $P_{TH}$ are again input to the optical amplifier 50 as a return light due to SBS, and the noise light components outside of the signal wavelength and the noise light components of a wavelength same as the signal wavelength, which do not reach the threshold value $P_{TH}$, pass through the dummy transmission path 13 to be absorbed in the non-reflection terminator 14.

The return light due to SBS generated in the dummy transmission path 13 is propagated inside the optical amplifier 50 towards the input side to be amplified up to a required level, and is then output to the optical circulator 17. At this time, the power of the WDM signal light (return light) input to the optical circulator 17 from the optical amplifier 50 is monitored, and in accordance with the monitor results, the drive conditions of the excitation light sources 52A and 52B or an attenuation amount of the variable optical attenuator 54, is controlled so that the power of the WDM signal light is adjusted to coincide with the target value.

The WDM signal light sent from the optical amplifier 50 to the second port of the optical circulator 17 is output from the third port of the optical circulator 17, to be sent to the latter stage optical transmission path 103 via the output terminal 16'.

In this way, according to the optical transmission system of the fourth embodiment, the same functional effect as for the case of the abovementioned basic structure can be obtained, and also the function of amplifying the WDM signal light up to a level exceeding the threshold value $P_{TH}$ for SBS generation and the function of adjusting the level of the return light due to SBS are realized by a single optical amplifier 50. Hence, the system structure can be even further simplified.

Next is a description of an optical transmission system according to a fifth embodiment.

In the optical transmission system of the fifth embodiment, description is given of a system structure taking into consideration an influence of wavelength shift due to SBS. Here, the wavelength shift due to SBS is a phenomenon where, with respect to the wavelength of input light, the wavelength of return light due to SBS is shifted by around 11 GHz to a long wavelength side (for example, with light of a 1550 nm band, around 0.09 nm). This wavelength shift due to SBS has a possibility of exerting an influence for example on the demultiplexing process of the WDM signal light in the optical receiving device.

Figure 13:
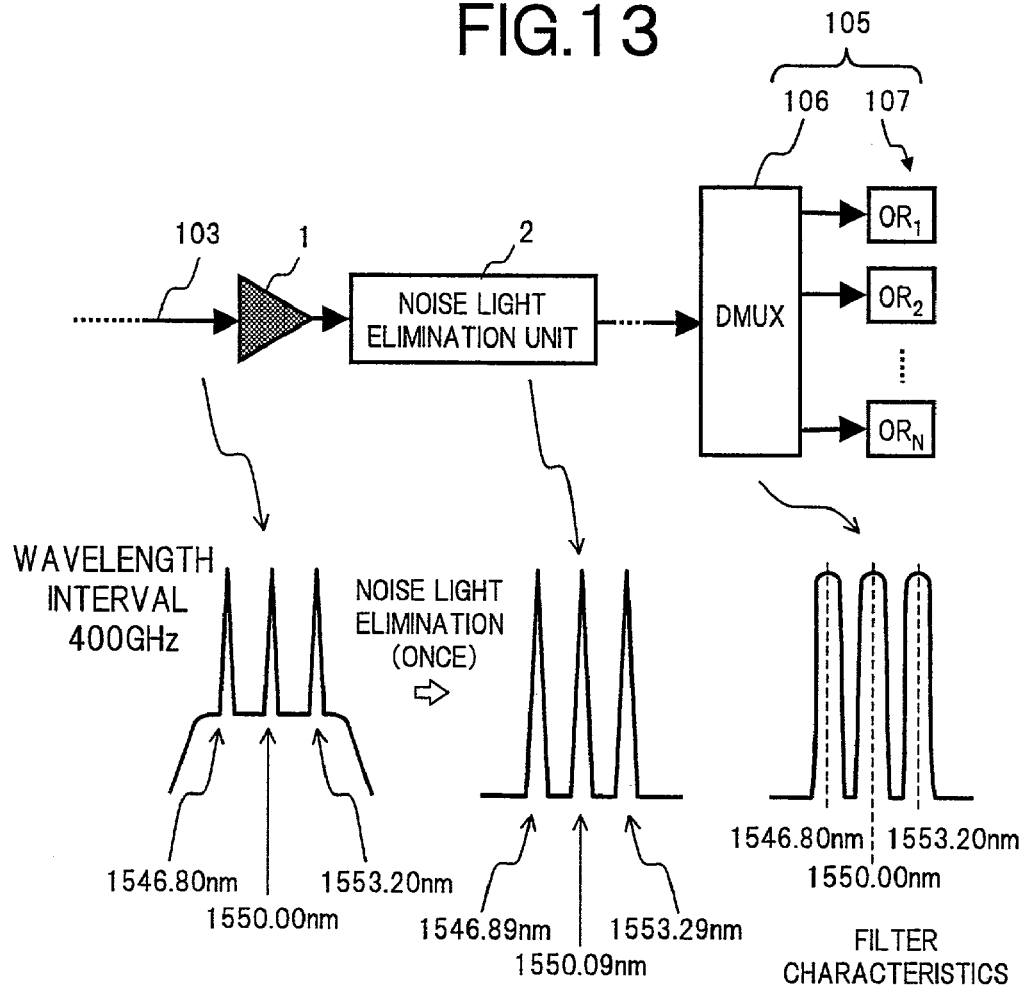
FIG. 13 is a diagram for explaining an influence of wavelength shift due to SBS.
Figure 13:
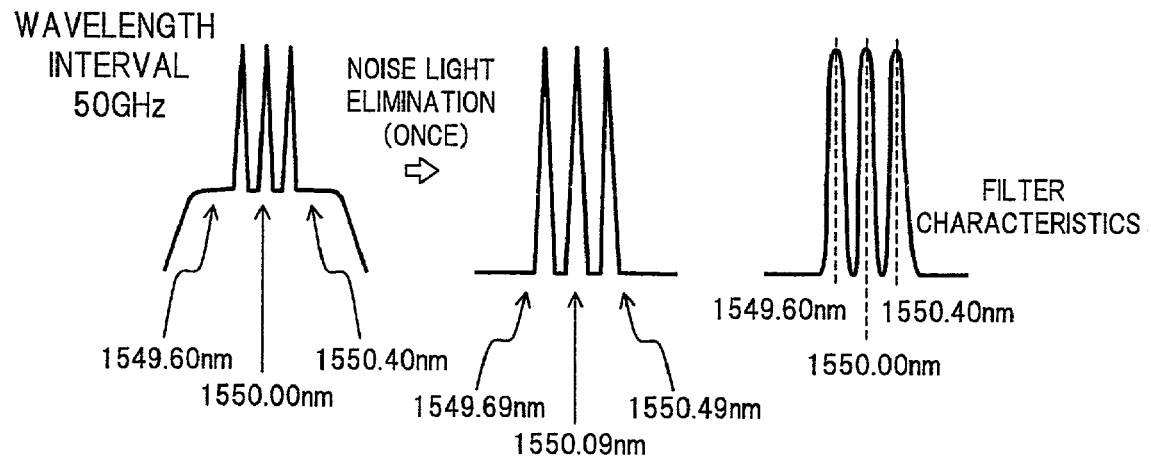

More specifically, for example as shown in the middle of FIG. 13, in a case of a system where the wavelength interval of the signal light of each channel contained in the WDM signal light is wide (in the example of the figure, a 400 GHz interval, that is, an interval of around 3.2 nm for the 1550 nm band), the filter characteristics (transmission bandwidth corresponding to each channel) of the demultiplexer 106 disposed inside the optical receiving device 105 can also be widen. Hence, if the number of times that the transmitted WDM signal light passes through the noise light elimination unit 2 is few, then the abovementioned demultiplexer may be used as is, and the signal light of each channel can be extracted from the received WDM signal light.

However, as shown at the bottom of FIG. 13, in a case of a system where the wavelength interval of the signal light is narrow (in the example of the figure, a 50 GHz interval, that is, an interval of around 0.4 nm for the 1550 nm band), the filter characteristics of the demultiplexer 106 also become narrow. Hence, even if the number of times that the WDM signal light passes through the noise light elimination unit 2 is few, due to the influence of the wavelength shift due to SBS, it is difficult to correctly extract the signal light of each channel with the demultiplexer 106.

Therefore, in the optical transmission system of the fifth embodiment, there is adopted a construction where the wavelength shift amount due to SBS is calculated beforehand based on how many times the transmission light passes through the noise light elimination unit for the whole system, and a demultiplexer having filter characteristics such that the center wavelength of each channel at the time of transmission is shifted by the abovementioned wavelength shift amount, is provided inside the optical receiving device.

Figure 14:
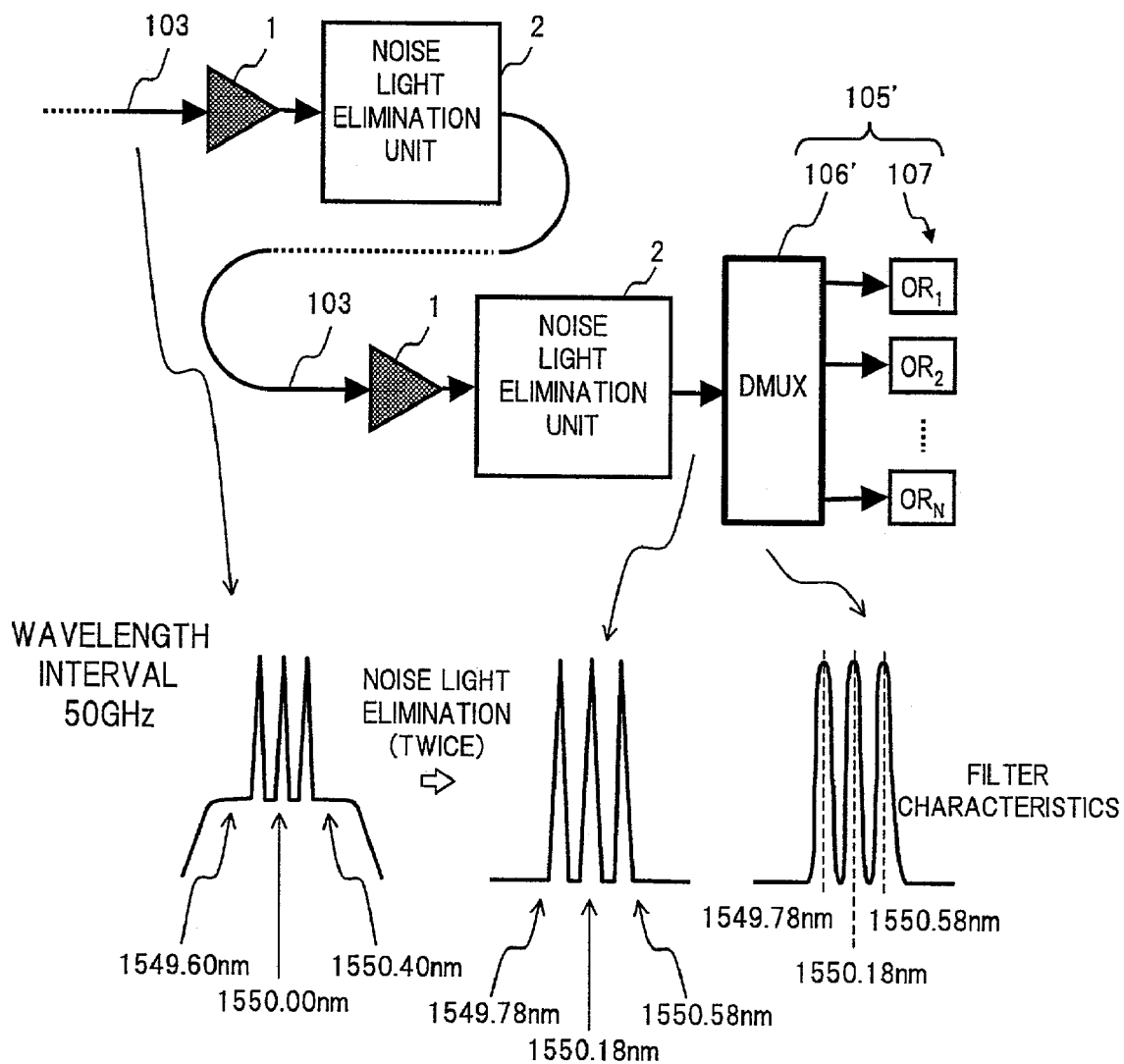
FIG. 14 is a conceptual diagram showing a specific example of an optical transmission system according to a fifth embodiment of the present invention.

FIG. 14 is a conceptual diagram showing a specific example of an optical transmission system of the fifth embodiment. Here, an example of the case for where the transmission light passes twice through the noise light elimination unit is specifically considered. In this case, the wavelength shift amount due to SBS for the whole system is calculated as 11 GHz×2=22 GHz, and assuming a WDM signal light of a 1550 nm band, this gives approximately 0.18 nm. For example, with a wavelength interval of the WDM signal light at 50 GHz, and the respective signal lights with the center wavelengths of the respective channels at the time of transmission at 1549.60 nm, 1550.00 nm and 1550.40 nm, then at the time of reception, the center wavelengths are respectively shifted to 1549.78 nm, 1550.18 nm and 1550.58 nm. Consequently, for a demultiplexer 106' inside an optical receiving device 105' a device having filter characteristics with the transmission center wavelengths positioned at 1549.78 nm, 1550.18 nm and 1550.58 nm is used. For the optical receivers 107 inside the optical receiving device 105', signal lights for which the wavelengths have been shifted due to SBS are respectively input. However, since each of the optical receivers 107 has basically no wavelength dependence, there is no special requirement for changing in accordance with the wavelength shift due to SBS.

By adopting such a construction, signal light of each channel contained in the WDM signal light transmitted over the whole system can be reliably extracted by the demultiplexer 106'.

Figure 15:
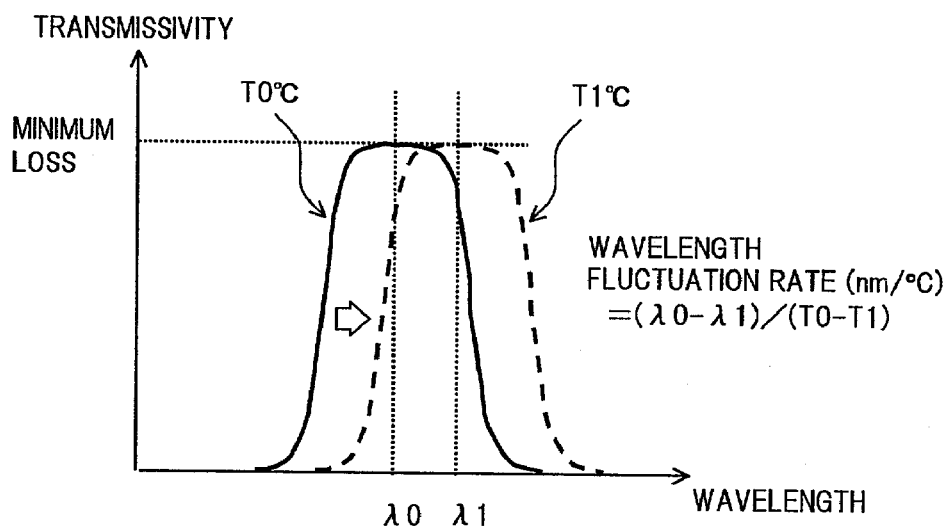
FIG. 15 is a diagram for explaining temperature characteristics of an AWG usable for a demultiplexer, related to the fifth embodiment.

In the abovementioned fifth embodiment, it was considered to use a device having fixed filter characteristics for the demultiplexer 106' inside the optical receiving device 105'. However, a device having variable filter characteristics may also be used. Specifically, it is possible to use, for example, an arrayed wave guide grating (AWG) or the like where, as illustrated in FIG. 15, the center wavelength of the filter characteristics is changed due to temperature changes. In FIG. 15, a temperature change directed to a certain single transmission band is shown.

Figure 16:
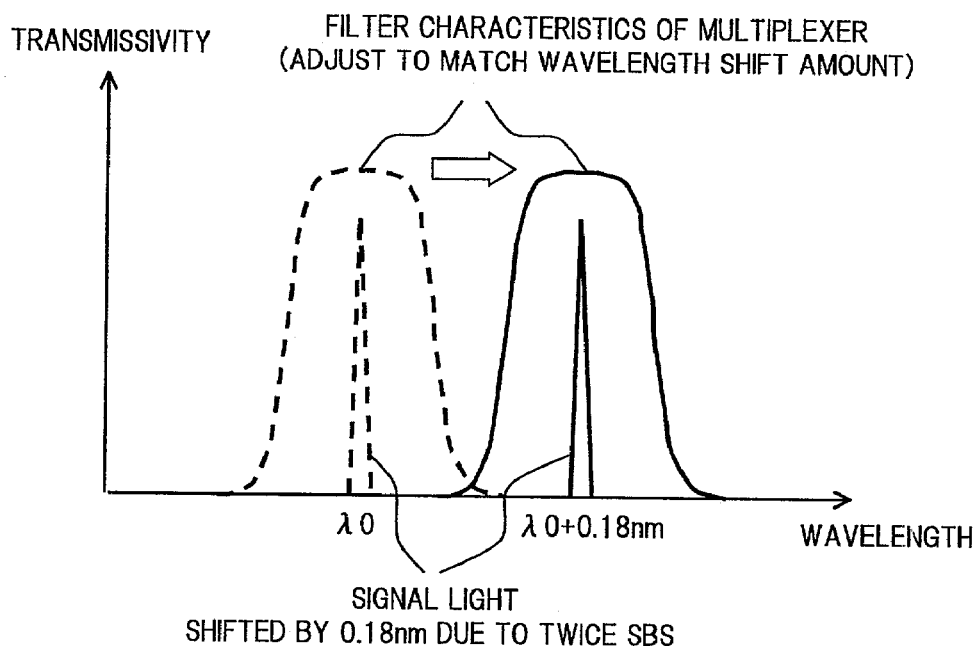
FIG. 16 is a diagram showing an example of where filter characteristics are controlled, in the case of using the AWG of FIG. 15.

In the case of using the AWG, assuming that a change rate of the wavelength with respect to temperature change is approximately 0.01 nm/° C. (typically, around 0.01 to 0.015 nm/° C.), then in the aforementioned example where the transmission light passes twice through the noise light elimination unit, a wavelength shift amount 0.18 nm due to SBS is converted into a control temperature difference to be 0.18/0.01=18° C. Consequently, if the operating conditions of for example a heater or Peltier or the like for changing the temperature of the AWG are adjusted, and as shown in FIG. 16, the control temperature of the AWG is changed by 18° C. from the reference temperature so that the center wavelength of the transmission band is shifted by 0.18 nm, then the wavelength fluctuation by passing twice through the noise light elimination unit, can be absorbed by the optical receiving device without altering the device itself. Surely, in a case where the transmission light passes once for all through the noise light elimination unit, since the wavelength shift amount due to SBS becomes 0.09 nm, it is possible to perform more easily the temperature control of the AWG.

Figure 17:
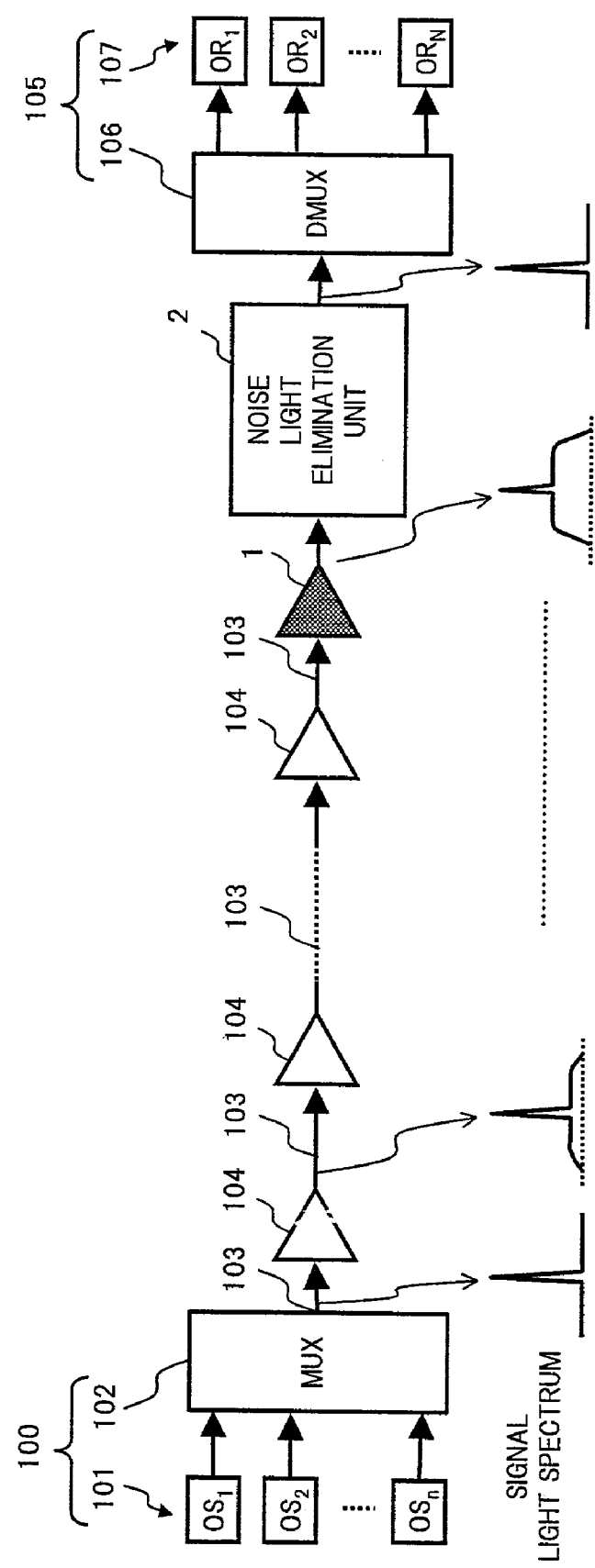
FIG. 17 is a diagram showing an example of where noise light elimination is executed just before the optical receiving device, related to respective embodiments of the present invention.
Figure 18:
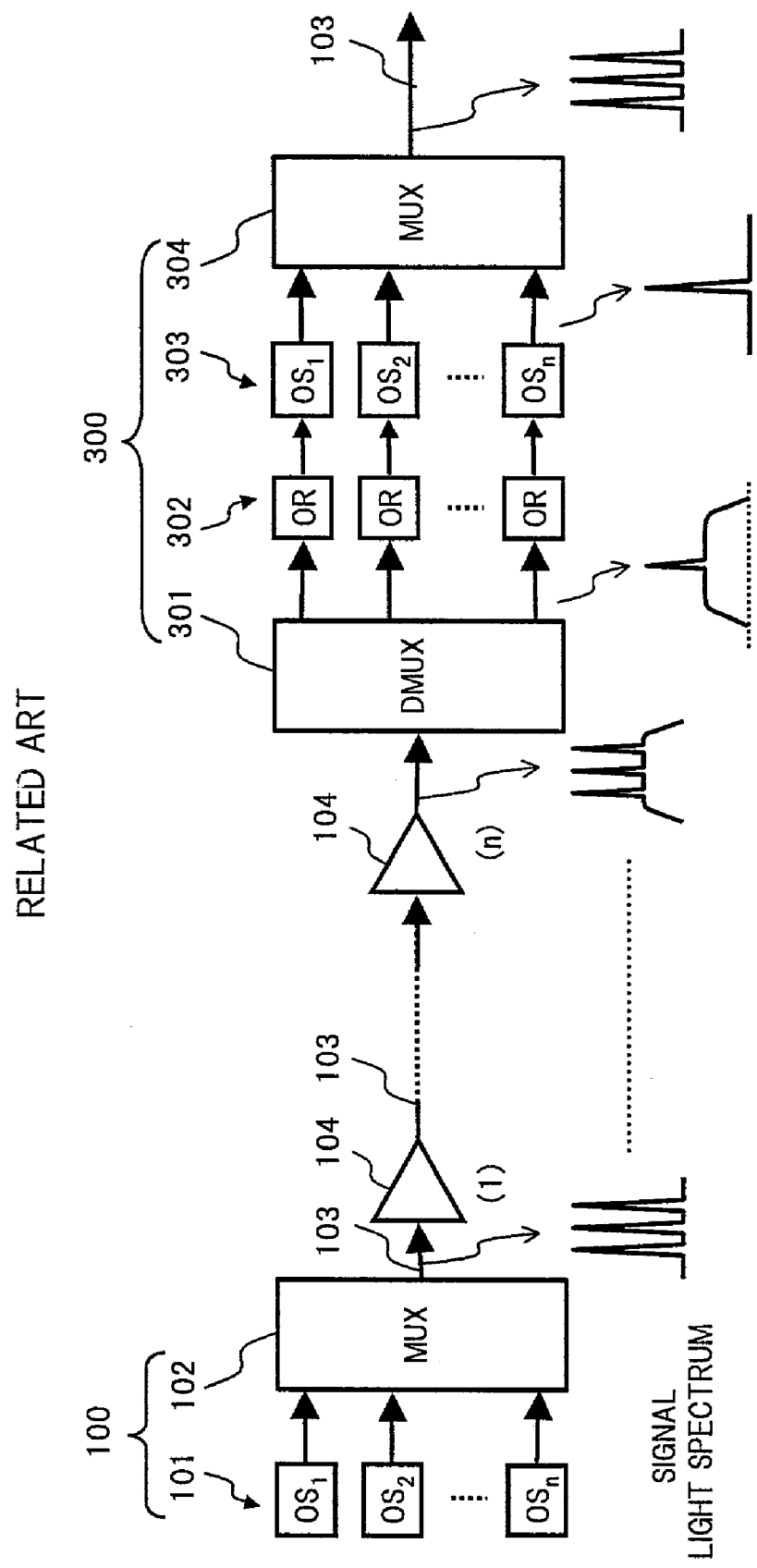
FIG. 18 is a block diagram showing a schematic construction of a conventional optical transmission system that performs noise light elimination based on optic-electric conversion.
Figure 19:
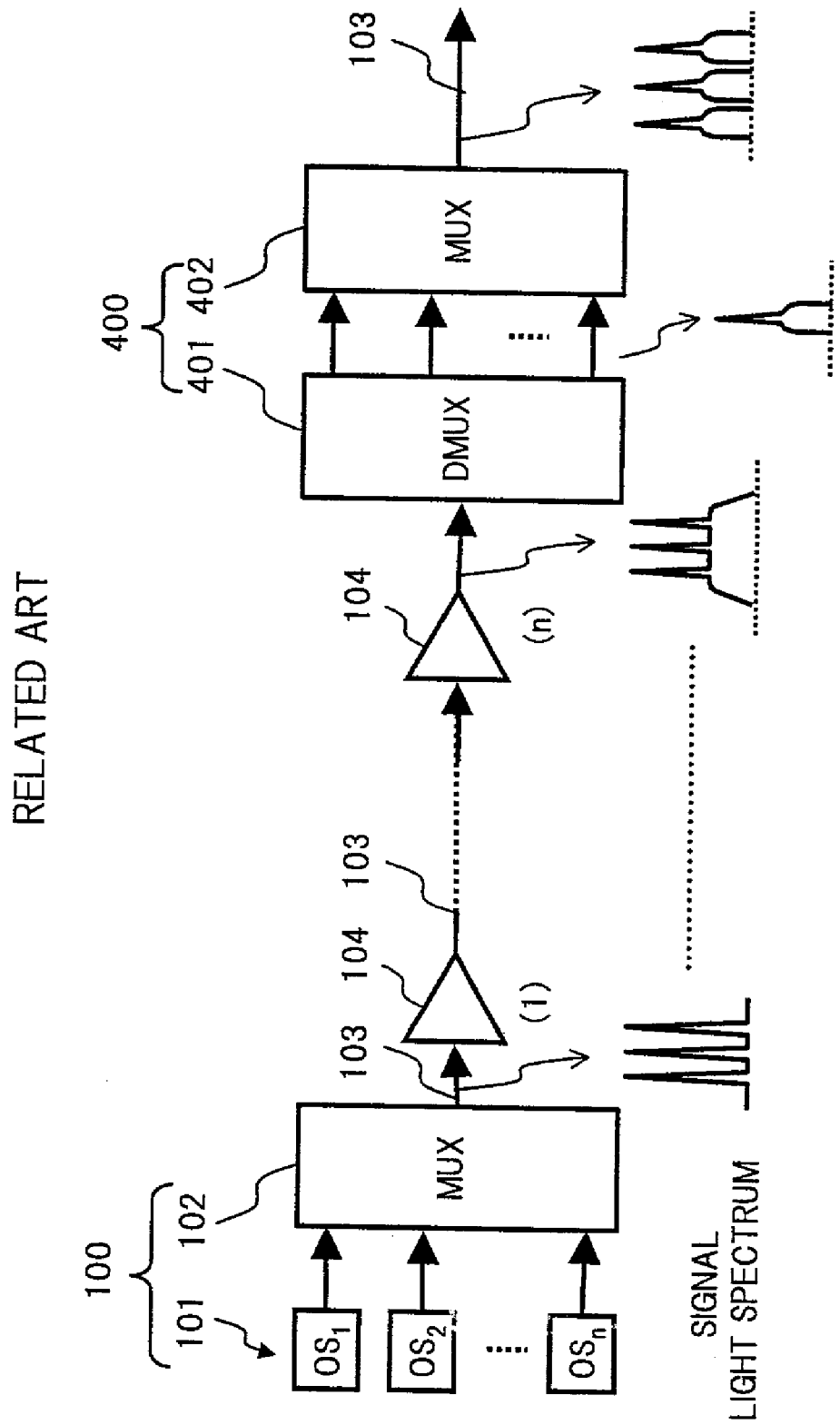
FIG. 19 is a block diagram showing a schematic construction of a conventional optical transmission system that performs noise light elimination based on demultiplexing and multiplexing of signal light.

Furthermore, in the abovementioned first through fifth embodiments, a high output type optical repeater and a noise light elimination unit are arranged for each of the repeating spans of "n" in number of the optical transmission system. However, the position for executing noise light elimination using SBS in the system is not limited to the above. For example, as shown in FIG. 17, the high output type optical repeater 1 and the noise light elimination unit 2 may be arranged just before the optical receiving device 105, so that the noise light accumulated in the WDM signal light input to the optical receiving device 105 is eliminated at one time. Such a system structure is suitable for example in the case of a system where signal light is not inserted or branched (add/drop) at nodes during transmission, since basically the OSNR of the transmission light during transmission is irrelevant, and the OSNR at the time of input to the optical receiving device becomes the most important.

Moreover, in the noise light elimination method of the present invention, as illustrated beforehand in FIG. 6, a functional effect can be obtained where the spectrum of the signal light extracted as the return light due to SBS becomes narrow (the wavelength component is reduced). Therefore, an application example is also possible where this system is applied immediately after the signal light is sent from the optical transmission device or the optical repeater, so that wavelength spread of the transmission light is suppressed.

What is claimed is:

1. A noise light elimination method comprising:
    amplifying a signal light by an optical amplifying section so that a power of signal light components in the amplified signal light exceeds a threshold value, and a power of noise light components in the amplified signal light is smaller than the threshold value;
    applying the amplified signal light to a stimulated Brillouin scattering generating medium that generates a return light due to stimulated Brillouin scattering when a light having a power exceeding the threshold value is applied; and
    extracting the return light generated by the stimulated Brillouin scattering generating medium as the amplified signal light, to thereby eliminate the noise light components in the amplified signal light;

wherein output light power of said optical amplifying section is set based on said threshold value and insertion loss of optical parts arranged between an output end of said optical amplifying section, and an input end of the stimulated Brillouin scattering generating medium, and wherein said threshold value is variably set in accordance with the stimulated Brillouin scattering generating medium, and said output light power is set at a level exceeding a sum of said threshold value and the value of the insertion loss of the optical parts arranged between the output end of said optical amplifying section and the input end of the stimulated Brillouin scattering generating medium.

2. A noise light elimination method according to claim 1, wherein a power of the return light generated by said stimulated Brillouin scattering generation medium is adjusted.

3. A noise light elimination apparatus comprising:

a stimulated Brillouin scattering generating medium that generates a return light due to stimulated Brillouin scattering when a light having a power exceeding a threshold value is applied to the stimulated Brillouin scattering generating medium;

an optical amplifying section that amplifies a signal light so that a power of signal light components in the amplified signal light exceeds the threshold value, and a power of noise light components in the amplified signal light is smaller than the threshold value; and an optical input/output section that applies the signal light amplified by said optical amplifying section to said stimulated Brillouin scattering generating medium, and extracts the return light generated by said stimulated Brillouin scattering generating medium as the amplified signal light, wherein output light power of said optical amplifying section is set based on said threshold value and insertion loss of optical parts arranged between an output end of said optical amplifying section, and an input end of said stimulated Brillouin scattering generating medium, and wherein said threshold value is variably set in accordance with the stimulated Brillouin scattering generating medium, and said output light power is set at a level exceeding a sum of said threshold value and the value of the insertion loss of the optical parts arranged between the output end of said optical amplifying section and the input end of said stimulated Brillouin scattering generating medium.

4. A noise light elimination apparatus according to claim 3, further comprising:

an adjusting section that adjusts a power of the return light generated by said stimulated Brillouin scattering generation medium.

5. A noise light elimination apparatus according to claim 4, wherein said adjusting section includes an optical amplifier that amplifies said return light.

6. A noise light elimination apparatus according to claim 4, wherein said adjusting section includes an optical attenuator that attenuates said return light.

7. A noise light elimination apparatus according to claim 4, further comprising:

a detection section that detects a power of the return light outputting from said adjusting section; and a control section that controls an operation of said adjusting section based on a detection result of said detection section.

8. A noise light elimination apparatus according to claim 3, wherein said stimulated Brillouin scattering generating medium is provided in a form of an optical transmission path.

9. A noise light elimination apparatus according to claim 8, wherein an optical fiber is used for said stimulated Brillouin scattering generating medium.

10. A noise light elimination apparatus according to claim 8, wherein an optical waveguide is used for said stimulated Brillouin scattering generating medium.

11. A noise light elimination apparatus according to claim 8, wherein another end of said stimulated Brillouin scattering generating medium positioned on an opposite side to one end to which the signal light amplified by said optical amplifying section is applied, is subjected to non-reflection termination treatment.

12. A noise light elimination apparatus according to claim 3, wherein said optical input/output section comprises an optical coupler having at least three ports, and an optical isolator, and the signal light amplified by said optical amplifier is input to a first port of said optical coupler and output from a second port of said optical coupler to said stimulated Brillouin scattering generation medium, and the return light generated by said stimulated Brillouin scattering generation medium is input to the second port of said optical coupler and branched into two to be output from the first port and a third port, respectively, and transmission of the return light outputting from the first port of said optical coupler to said optical amplifying section is blocked by said optical isolator.

13. A noise light elimination apparatus according to claim 3, wherein said optical input/output section includes an optical circulator arranged between an optical output end of said optical amplifying section and an optical input end of said stimulated Brillouin scattering generating medium.

14. An optical transmission system for amplifying a signal light sent from an optical transmission device to an optical transmission path, by optical repeaters arranged on the optical transmission path, to repeatedly transmit the signal light to an optical receiving device, comprising:

at least one of the noise light elimination apparatus recited in claim 3 on the optical transmission path.

15. An optical transmission system according to claim 14, wherein said optical receiving device includes a demultiplexer that demultiplexes the signal light transmitted on said optical transmission path, in accordance with a wavelength thereof, and said demultiplexer has filter characteristics where a center wavelength of a transmission band is set in accordance with a wavelength shift amount due to stimulated Brillouin scattering occurring in said noise light elimination apparatus.

16. An optical transmission system according to claim 15, wherein said demultiplexer includes an arrayed wave guide grating capable of adjusting the filter characteristics.

17. A method comprising:

providing a stimulated Brillouin scattering (SBS) generating medium that generates a return light due to SBS when a light having a power exceeding a threshold value of the SBS generating medium is input to the SBS generating medium, wherein
  the threshold value is variably set in accordance with the SBS generating medium, and
  a value of insertion loss of optical parts arranged between an optical amplifying section and an input end of the SBS generating medium is added to the threshold value;
amplifying a signal light so that a power of signal light components in the amplified signal light exceeds a sum of the threshold value of the SBS generating medium and the value of the insertion loss of the optical parts arranged between the optical amplifying section and the input end of the SBS generating medium, and so that a power of noise light components in the amplified signal light is smaller than the threshold value of the SBS generating medium;
inputting the amplified signal light to the SBS generating medium so that a return light is thereby generated in response to the signal light components in the amplified signal light; and
extracting the return light generated by the SBS generating medium in response to the signal light components in the amplified signal light, to thereby eliminate the noise light components from the amplified signal light.

18. A method as in claim 17, further comprising:
providing the extracted return light to a transmission line as the amplified signal light.

19. An apparatus comprising:
means for providing a stimulated Brillouin scattering (SBS) generating medium that generates a return light due to SBS when a light having a power exceeding a threshold value of the SBS generating medium is input to the SBS generating medium, wherein
  the threshold value is variably set in-accordance with the SBS generating medium, and
  a value of insertion loss of optical parts arranged between an optical amplifying section and an input end of the SBS generating medium Is added to the threshold value;
means for amplifying a signal light so that a power of signal light components in the amplified signal light exceeds a sum of the threshold value of the SBS generating medium and the value of the insertion loss of the optical parts arranged between an optical amplifying section and an input end of the SBS generating medium, and so that a power of noise light components in the amplified signal light is smaller than the threshold value of the SBS generating medium;
means for inputting the amplified signal light to the SBS generating medium so that a return light is thereby generated in response to the signal light components in the amplified signal light; and
means for extracting the return fight generated by the SBS generating medium in response to the signal light components in the amplified signal light, to thereby eliminate the noise light components from the amplified signal light.

20. A method comprising:
inputting an amplified signal light to a stimulated Brillouin scattering (SBS) generating medium, the inputted amplified signal light having a signal light component with a power exceeding a sum of a threshold value of the SBS generating medium at which return light due to SBS is generated in the SBS generating medium and a value of insertion loss of optical parts arranged between an optical amplifying section and an input end of the SBS generating medium, and having a noise light component with a power smaller than the threshold value, to thereby cause the SBS generating medium to generate return light in response to the signal light component in the amplified signal light but not generate a return light in response to the noise light component, wherein
  the threshold value is variably set in accordance with the SBS generating medium, and
  the value of the insertion loss of optical parts arranged between the optical amplifying section and input end of the SBS generating medium is added to the threshold value; end
extracting the return light generated by the SBS generating medium in response to the signal light component in the amplified signal light.

21. A method as in claim 20, further comprising:
providing the extracted return light to a transmission line as the amplified signal light.

22. An apparatus comprising:
means for inputting an amplified signal light to a stimulated Brillouin scattering (SBS) generating medium, the inputted amplified signal light having a signal light component with a power exceeding a sum of a threshold value of the SBS generating medium at which return light due to SBS is generated in the SBS generating medium and a value of insertion loss of optical parts arranged between an optical amplifying section and an input end of the SBS generating medium, and having a noise light component with a power smaller than the threshold value, to thereby cause the SBS generating medium to generate return light in response to the signal light component in the amplified signal light but not generate a return light in response to the noise light component, wherein
  the threshold value is variably set in accordance with the SBS generating medium, and
  the value of the insertion loss of optical parts arranged between the optical amplifying section and the input end of the SBS generating medium is added to said threshold value; and
  means for extracting the return light generated by the SBS generating medium in response to the signal light component in the amplified signal light.

* * * * *

UNITED STATES PATENT AND TRADEMARK OFFICE
CERTIFICATE OF CORRECTION

| | |
|---|---|
| PATENT NO. | : 7,142,782 B2 |
| APPLICATION NO. | : 10/092305 |
| DATED | : November 28, 2006 |
| INVENTOR(S) | : Toshihiro Ohtani |

It is certified that error appears in the above-identified patent and that said Letters Patent is hereby corrected as shown below:

Column 21, Line 35, change "in-accordance" to --in accordance--.

Column 21, Line 39, change "Is" to --is--.

Column 21, Line 54, change "fight" to --light--.

Column 22, Line 21, after "and" insert --the--.

Column 22, Line 23, change "end" to --and--.

Signed and Sealed this

Twenty-seventh Day of March, 2007

JON W. DUDAS
*Director of the United States Patent and Trademark Office*